(12) United States Patent
Hidehira et al.

(10) Patent No.: US 6,618,109 B2
(45) Date of Patent: Sep. 9, 2003

(54) LIQUID CRYSTAL DISPLAY APPARATUS

(75) Inventors: Masanobu Hidehira, Tokyo (JP);
Makoto Watanabe, Tokyo (JP);
Syouichi Kuroha, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 09/916,778

(22) Filed: Jul. 27, 2001

(65) Prior Publication Data
US 2002/0033922 A1 Mar. 21, 2002

(30) Foreign Application Priority Data
Jul. 28, 2000 (JP) .................................... 2000-229779

(51) Int. Cl.[7] ............................................. G02F 1/1343
(52) U.S. Cl. ...................................................... 349/141
(58) Field of Search .......................................... 349/141

(56) References Cited

U.S. PATENT DOCUMENTS

2002/0047975 A1 * 4/2002 Lee et al.
2002/0159016 A1 * 10/2002 Nishida et al.

FOREIGN PATENT DOCUMENTS

| JP | 10-307295 | 11/1998 |
| JP | 11-030784 | 2/1999 |
| JP | 11-125835 | 5/1999 |
| JP | 2000-056320 | 2/2000 |
| WO | WO 99/45430 | 9/1999 |

* cited by examiner

Primary Examiner—John F. Niebling
Assistant Examiner—Stanetta Isaac
(74) Attorney, Agent, or Firm—Scully, Scott, Murphy & Presser

(57) ABSTRACT

A liquid crystal display apparatus has a pair of substrates opposing to each other and a liquid crystals sandwiched between the pair of substrates. One side of substrate is provided with gate lines and signal lines which approximately cross each other. TFTs are provided close to intersection portion of the gate line and the signal line. Pixel electrodes and common electrodes are provided at each pixel enclosed by the gate line and the signal line. Each of pixel electrodes and common electrodes has bent points more than one and is alternately formed in parallel with each other. Both the pixel electrode and the common electrode are made up of bent sections and projected sections projecting toward concave sections of opposite electrodes from convex side top sections of the bent sections. In the liquid crystal display apparatus, improvement of visual angle characteristics and response characteristics is planned in such a way that the projected section allows electric field close to the bent section to be stabilized, and allows electric field strength to be enhanced.

14 Claims, 18 Drawing Sheets

LIQUID CRYSTAL DISPLAY APPARATUS

BACKGROUND OF THE INVENTION

1. Field of the Invention

The present invention relates to a liquid crystal display apparatus, and more particularly to a liquid crystal display apparatus of IPS (In-Plane Switching) system in which liquid crystal is made to drive within a surface approximately parallel to a TFT (Thin Film Transistor) substrate by applying a voltage to a pixel electrode and a common electrode therebetween formed on the TFT substrate.

2. Description of the Related Art

An active matrix type liquid crystal display apparatus, having a picture quality of high dignity, uses a thin film transistor (hereinafter referred to TFT) as a switching element of pixels, and is widely used as space-saving designed monitor of a desktop computer and so forth. Generally, in the operating mode of the liquid crystal display apparatus, there are two systems of Twisted Nematic: TN system which allows direction of directors of oriented liquid crystal molecules to be rotated in the perpendicular direction to a transparent substrate and In-Plane Switching: IPS system which allows liquid crystal molecules to be rotated in the direction parallel to a transparent substrate.

The IPS system liquid crystal display apparatus alternately forms pixel electrode and common electrode on the first transparent substrate constituting the TFT, wherein the teeth of a comb of the pixel electrode is parallel to the teeth of a comb of the common electrode with each other, and a light transmission quantity is controlled by changing the direction of the director of the liquid crystal molecule with forming electric field parallel to the substrate by applying a voltage to the pixel electrodes and the common electrodes therebetween. Consequently, because the director rotates within the substrate surface in this display system, the problem that a relationship between the light transmission quantity and the voltage application quantity in the case of TN system, when watching in the direction of the director and in the direction of normal of the substrate has a large difference, does not occur, then it is possible to obtain good picture while watching from very wide angle of vision.

However, in the conventional IPS system of liquid crystal display apparatus, there is a problem that the pixel electrodes and the common electrodes are formed in the straight-line shape mutually, and the liquid crystal molecules perform one directional rotation, in this case of watching from an oblique direction in white indication condition, colored condition occurs. Accordingly, a multi domain structure is proposed for solving the problem, which forms the pixel electrodes and the common electrodes in such a way as to bend the pixel electrodes and the common electrodes at bending point more than one to form a plurality of domains in which orientation direction thereof is different within one pixel.

As to the aforementioned conventional technique, it is explained with referring to FIG. 1A, FIG. 1B and FIG. 2. FIG. 1 is a view illustrating a structure of a conventional IPS system liquid crystal display apparatus. FIG. 1A is a plan view and FIG. 1B is a sectional view along E—E line of FIG. 1A. Further, FIG. 2 is a view schematically illustrating electric field between electrodes and rotational direction of the liquid crystal molecules. This liquid crystal display apparatus is constituted by a first transparent substrate 1 on which TFT is formed, a second transparent substrate 2 on which a color filter (CF) is formed, and liquid crystal 17 that is sandwiched therebetween, and in the first transparent substrate 1 forms a gate line 2 and a signal line 6 at approximately right angle, and TFT 5 is arranged in the shape of matrix at an intersection thereof. Furthermore, the pixel electrode 7 and the common electrode 3 are alternately formed in parallel with each other at the respective pixels, bending at the bent point more than one. Moreover, a black matrix 12 for shading extra light, color layer 13 for performing color indication of three RGB colors and flattening film 14 for covering them are formed on the second transparent substrate 11.

Then, orientation film 18 is coated to opposite surfaces of these first transparent substrate 1 and second transparent substrate 11, and the liquid crystal 17, homogeneously oriented in approximately parallel with extended direction of the signal line 6, is sandwiched between both substrates 1, 11. A polarization plate 16a is affixed to outside of the substrate 1. A conductive film 15 is formed at outside of the substrate 11, and a polarization plate 16b is affixed to outside of the conductive film 15. A polarization axis of both polarization plate 16a, 16b are at right angles with each other, one polarization axis is set in parallel with oriented direction of the liquid crystal molecule 17a. Then, write of electric potential is made to execute to the pixel electrode 7 through the TFT 5 to give lateral electric field to the bent pixel electrodes 7 and the bent common electrodes 3 therebetween, thus indication is made to control so that operation allows the liquid crystal 17 to be subjected to twist deformation within a surface parallel to the substrates 1, 11.

According to this method, when the voltage is applied to the pixel electrodes 7 and the common electrodes 3 therebetween, as illustrated in FIG. 2, the electric field 25 is generated in each different direction at two regions (upper region and lower region of FIG. 2) that are divided by the line which links top of the bent sections, therefore, the liquid crystal 17a which is initially oriented in the upper direction and the lower direction of FIG. 2 is twisted in two directions. Then, when watching from an oblique direction in the white indication condition, since the liquid crystal molecules 17a of the two regions compensate with each other, effect is obtained that colored condition is reduced. Furthermore, an equipotential surface 24 is formed in parallel with both the pixel electrodes 7 and the common electrodes 3.

However, in the conventional multi-domain liquid crystal display apparatus, since the initially oriented direction of molecules 17a is approximately right angle to the electric field direction in a adjacent area close to the line which joins tops of bent sections of the pixel electrode 7 or common electrode 3, rotational direction of the liquid crystal molecules 17a depends on whether the liquid crystal molecules 17a rotate in which direction depends on shape of the bent section, and when shapes of the bent sections are fluctuated depending on manufacturing errors, irregularities occur in connection with its orientation direction of the liquid crystal molecules 17a, resulting in, thus, the problem that disclination occurs. Furthermore, since the liquid crystal molecules 17a of the domain of both sides of the bent section rotate in the opposite direction mutually, motion of the liquid crystal molecules 17a close to the line joining top of the bent section is inhibited by the liquid crystal molecules 17a of the both sides, as a result, there is the problem that delay of response occurs.

Explained the circumstances referring to FIG. 2, the liquid crystal molecules 17a placed at upper section of FIG. 2 rotates clockwise because left-down electric field 25 acts to upper and lower initial orientation direction of this liquid crystal molecules 17a, on the other hand, the liquid crystal molecules 17a placed at lower section of FIG. 2 rotate counterclockwise because left-up electric field 25 acts to the liquid crystal molecules 17a, however, the liquid crystal molecules 17a existing in the region 23 of unstable orientation direction close to the line which joins tops of bent sections rotate in the direction without intention in response to the shape of the bent section sensitively, as a result, rotating in unexpected direction depending on slight shape irregularity or deviation of the initial orientation direction.

Further, generally, respective liquid crystal molecules 17a of the liquid crystal 17, under the ON or OFF condition of the voltages, do not independently rotate mutually but each liquid crystal molecule 17a exerts an influence mutually on the basis of elastic property, in which one liquid crystal molecule 17a rotates, then the other liquid crystal molecule 17a is coupled to this rotation, thus group of the liquid crystal molecules 17a perform twist deformation simultaneously. Namely, on the occasion of ON or OFF of the voltage, the liquid crystal 17 deforms in such a way that elastic power depending on elastic constants K11, K22, and K33 corresponding to each distortion of spread, twist, and bend respectively acts on the liquid crystal 17.

Considered actions of the liquid crystal molecule 17a having such elastic property in the area close to the bent point of FIG. 2, in the white indication condition where the voltage is applied to the common electrodes 3 and the pixel electrodes 7 therebetween, the liquid crystal molecule 17a at upper position of a center line is intended to rotate in the opposite direction against the liquid crystal molecule 17a at lower position of the center line, thereby, movement of the liquid crystal molecules 17a close to the line joining tops of the bent sections are influenced by the elastic force of the aforementioned upper and lower positioned liquid crystal molecules 17a is interrupted and response thereof slows down.

SUMMARY OF THE INVENTION

It is an object of the present invention to provide a liquid crystal display apparatus, which can achieve to prevent disclination, and to allow response to be speeded up and to cause luminance to be enhanced with high aperture rate.

A first aspect of a liquid crystal display apparatus according to the present invention comprises a pair of substrates opposing to each other and a liquid crystal sandwiched between the pair of substrates. In one side of the pair of substrates, a plurality of gate lines and a plurality of signal lines are provided to cross each other, which are at approximately right angles to each other. TFT is provided close to an intersection of the gate line and the signal line. Pixel electrodes and common electrodes are provided at each pixel surrounded by the gate line and the signal line. Each of which has bent points more than one and is alternately formed in parallel to mutually The IPS system liquid display apparatus causes liquid crystal molecule to be rotated within a surface in approximately parallel with the substrate by applying voltage applied to the pixel electrode and the common electrode therebetween. Both the pixel electrode and the common electrode comprise bent sections, and projected sections projecting toward concave section of the bent section of an opposite electrode side from convex side top section of the bent section. Also, the common electrode around the pixel disposed close to the signal line is formed in a shape of straight line along the signal line in connection with its outer edge at the side of the signal line.

In the present invention, the liquid crystal display apparatus can adopt a configuration wherein when viewed from the normal of the substrate, the projected section and the concave section of the bent section of the opposite electrode are formed so that both are not overlapped with each other.

Also, in the present invention, the liquid crystal display apparatus can adopts a configuration wherein the projected section is formed in rectangular shape, in rectangular shaped projected body provided with a pointed end section projecting toward the concave section of the bent section of the opposite electrode, in rectangular shaped projected body provided with a circular arc shaped pointed end section, or in V-character shape projecting toward the concave section of the bent section of the opposite electrode.

Further, in the present invention, the liquid crystal display apparatus preferably adopts a configuration wherein the number of bent point of the pixel electrode and the common electrode is taken to be n (n is odd numbers more than 1), adjacent the pixel electrode and the common electrode are formed, and unit pixel which becomes aperture section is enclosed by light shading section, in cases where length of electrode extending direction of the unit pixel is taken to be a, length of electrode opposite direction of the unit pixel is taken to be b, width of the projected section is taken to be d, and a ratio of length of the projected section to clearance between the pixel electrode and the common electrode is taken to be η, in which combination among n, d, and η is preferably selected so that following equation that indicates an aperture rate becomes maximum:

$$(a-nd\eta) \times (b-(a \times \tan\theta)/(n+1))/ab$$

Furthermore, in the present invention, the liquid crystal display apparatus preferably adopts a configuration wherein width of the signal line is taken to be D, distances between outer edge of the common electrode around the pixel disposed at a position adjacent to the signal line and the signal line is taken to be E, and width of part of the narrowest width of the common electrode is taken to be F, in which F is preferably set so that F becomes larger value than D×0.75−E.

Also, in the present invention, the liquid crystal display apparatus preferably adopts a configuration wherein film thickness of a passivation film is set so that a difference in level on the passivation film, which is formed at upper layer of the pixel electrode and the common electrode becomes less than 200 nm. Further, in the present invention, the liquid crystal display apparatus preferably adopts a configuration wherein the TFT is disposed in such a way that gate length direction of the TFT is in approximately parallel to or at approximately right angles to initial orientation direction of a liquid crystal molecule. Furthermore, in the present invention, the liquid crystal display apparatus adopts a configuration wherein the TFT is disposed close to an intersection of the gate line and the signal line at wide width side of the common electrode existing at side end section of the gate line among the common electrodes disposed close to the signal line.

In a second aspect of the liquid crystal display apparatus according to the present invention, the liquid crystal molecule is initially oriented obliquely to a direction which is at right angles to the gate line, and the TFT is stationed so that a gate length direction of the TFT is in approximately parallel to the initial orientation direction or is at approximately right angles to the orientation direction.

In a third aspect of a liquid crystal display apparatus according to the present invention, the common electrode around the pixel arranged close to the signal line is formed in such a way that outer edge of the common electrode at the signal line side is formed in the straight line shape along the signal line, and the TFT is stationed close to an intersection between the gate line and the signal line, which intersection exists at the wide width side of the common electrode in the gate line side end section among the common electrodes arranged close to the signal line.

BRIEF DESCRIPTION OF THE DRAWINGS

FIG. 4 is a view schematically illustrating process order of manufacturing method of the liquid crystal display apparatus according to the first embodiment of the present invention.

FIG. 5 is a view schematically illustrating process order of manufacturing method of the liquid crystal display apparatus according to the first embodiment of the present invention.

FIG. 6 is a view schematically illustrating process order of manufacturing method of the liquid crystal display apparatus according to the first embodiment of the present invention.

FIG. 7 is a view schematically illustrating process order of manufacturing method of the liquid crystal display apparatus according to the first embodiment of the present invention.

FIG. 17A and FIG. 17B are plan views, and FIG. 17C is a sectional view;

THE PREFERRED EMBODIMENTS OF THE INVENTION

Figure 1A:
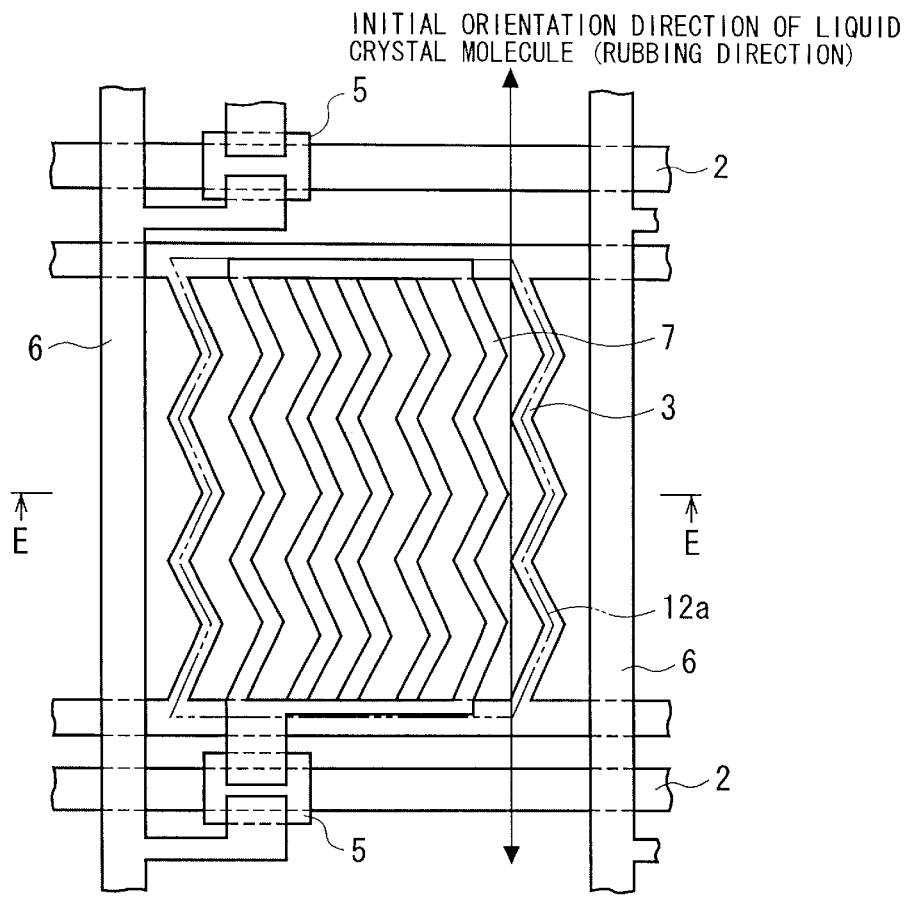
FIG. 1A is a plan view illustrating a structure of a conventional liquid crystal display apparatus.
Figure 1B:
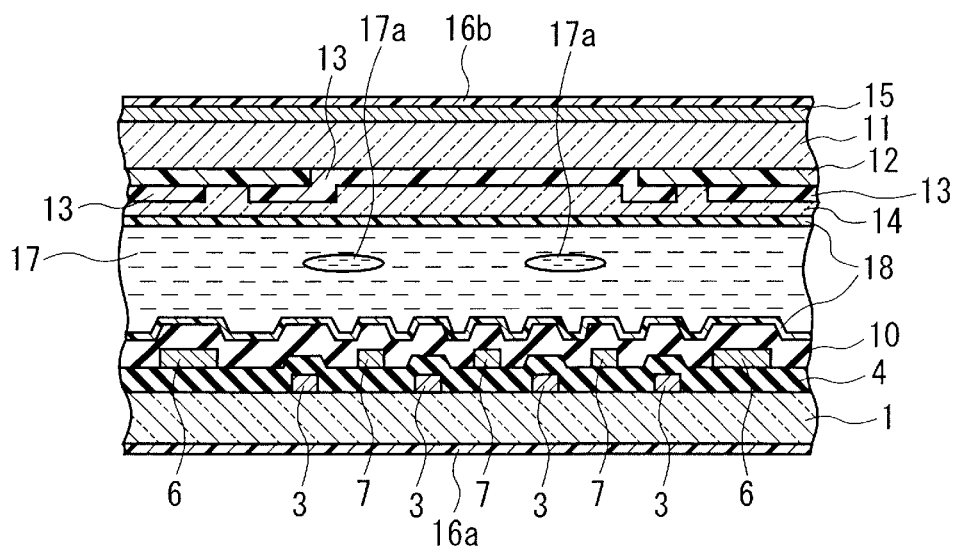
FIG. 1B is a sectional view along line E—E of FIG. 1A.
Figure 2:
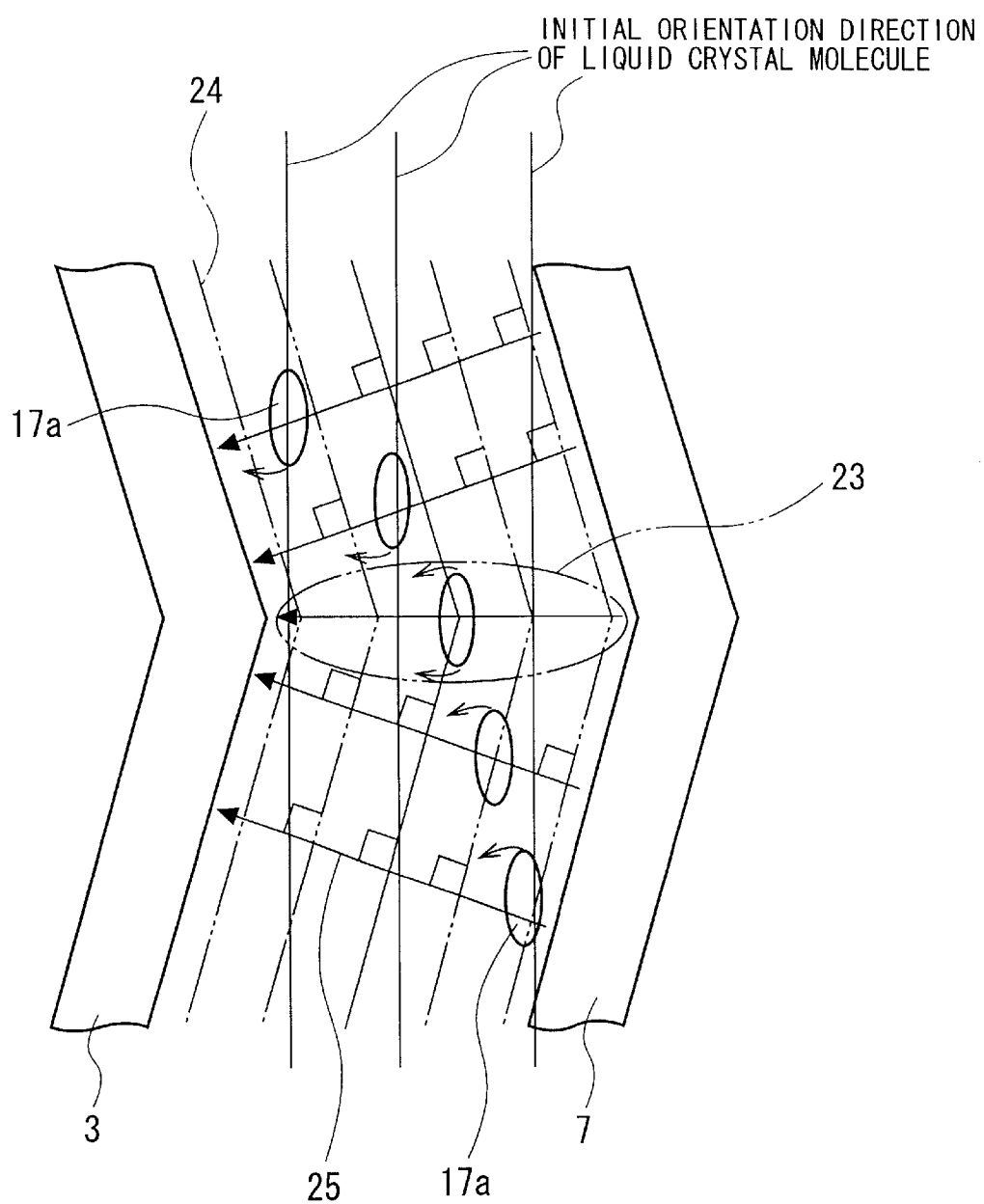
FIG. 2 is a plan view illustrating electric field direction and rotational direction of liquid crystal molecules of the conventional liquid crystal display apparatus.

The liquid crystal display apparatus according to the embodiment of the present invention will be described in detail referring to accompanying drawings below.

The liquid crystal display apparatus according to the present embodiment, in one preferred embodiment, which comprises one pair of opposite substrates 1, 11, liquid crystals 17 being sandwiched between one pair of the substrates 1 and 11, and one side of the substrate 1 is provided with a gate line 2 and a signal line 6 in which the gate line 2 is at approximately right angles to the signal line 6, TFT 5 provided close to the intersection of both lines 2 and 6, and pixel electrodes 7 and common electrodes 3 with bent points more than one that are formed at respective pixels enclosed by the gate line 2 and the signal line 6, and that are alternately formed in parallel with each other. The both pixel electrode 7 and the common electrode 3 constituted by bent sections 9a and projected section 9b projected toward concave section of opposite electrode from projecting side top section of the bent section 9a, and the projected section 9b allows electric field close to the bent section to be stabilized and allows electric field strength to be intensified to improve visual angle characteristics and response characteristics.

[First Embodiment]

Figure 3:
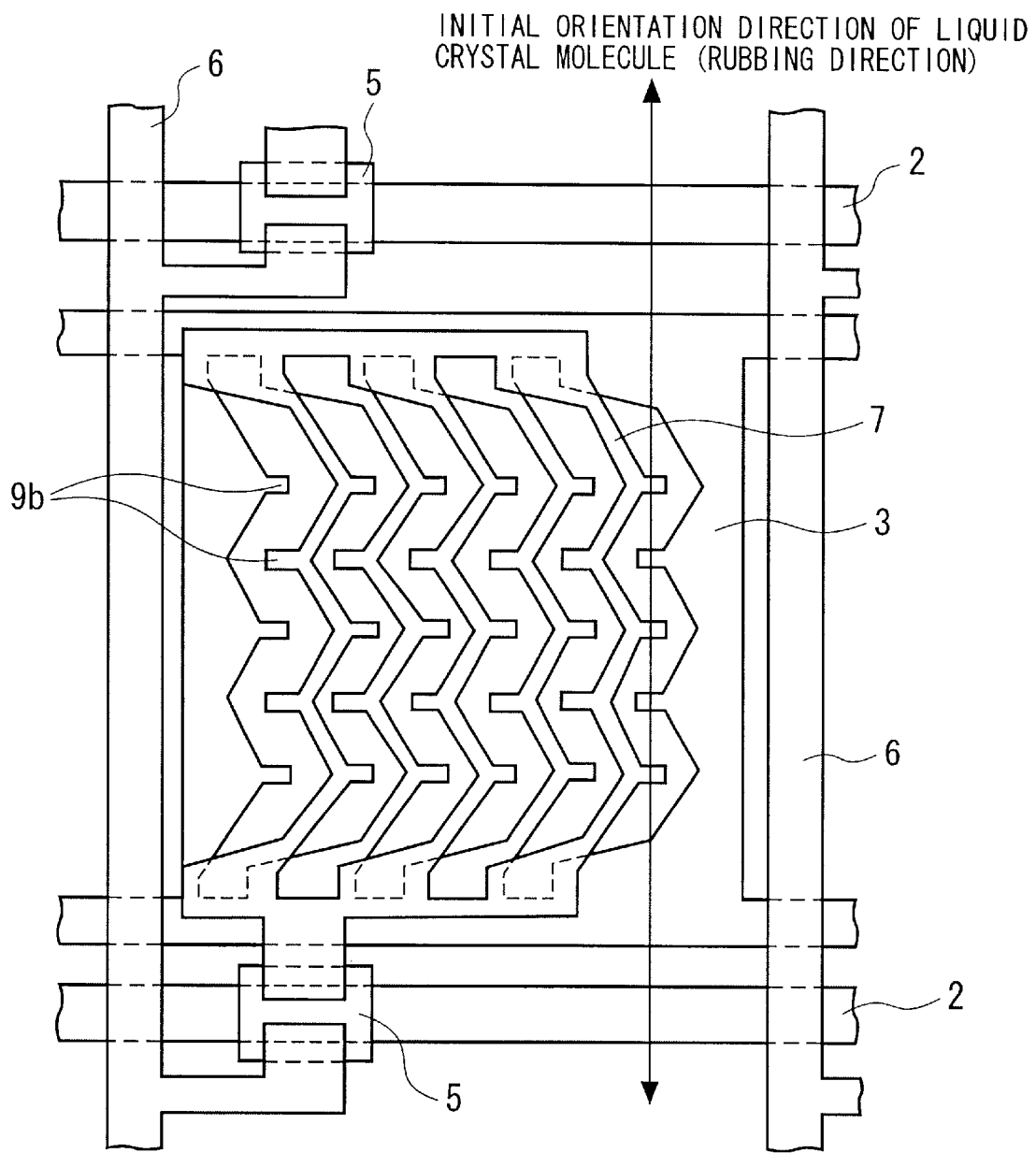
FIG. 3 is a plan view illustrating a structure of a liquid crystal display apparatus according to a first embodiment of the present invention.
Figure 4A:
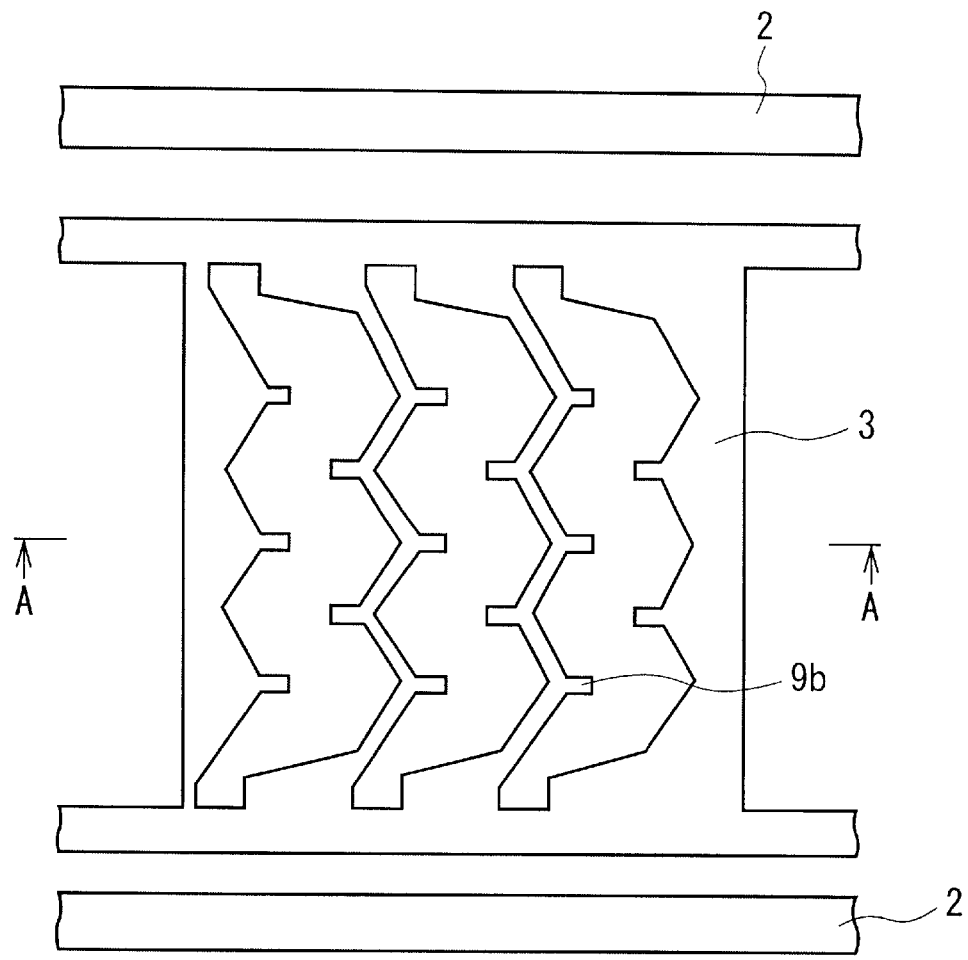
FIG. 4A is a plan view.
Figure 4B:
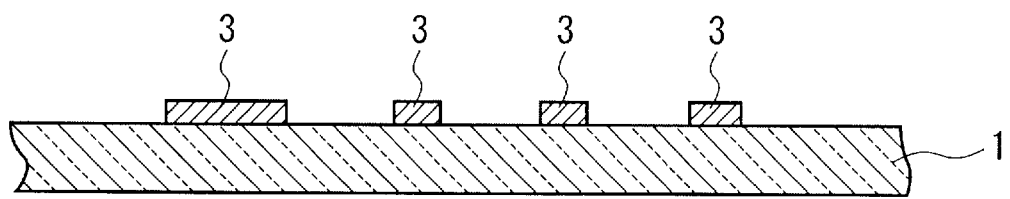
FIG. 4B is a sectional view along line A—A of FIG. 4A.
Figure 5A:
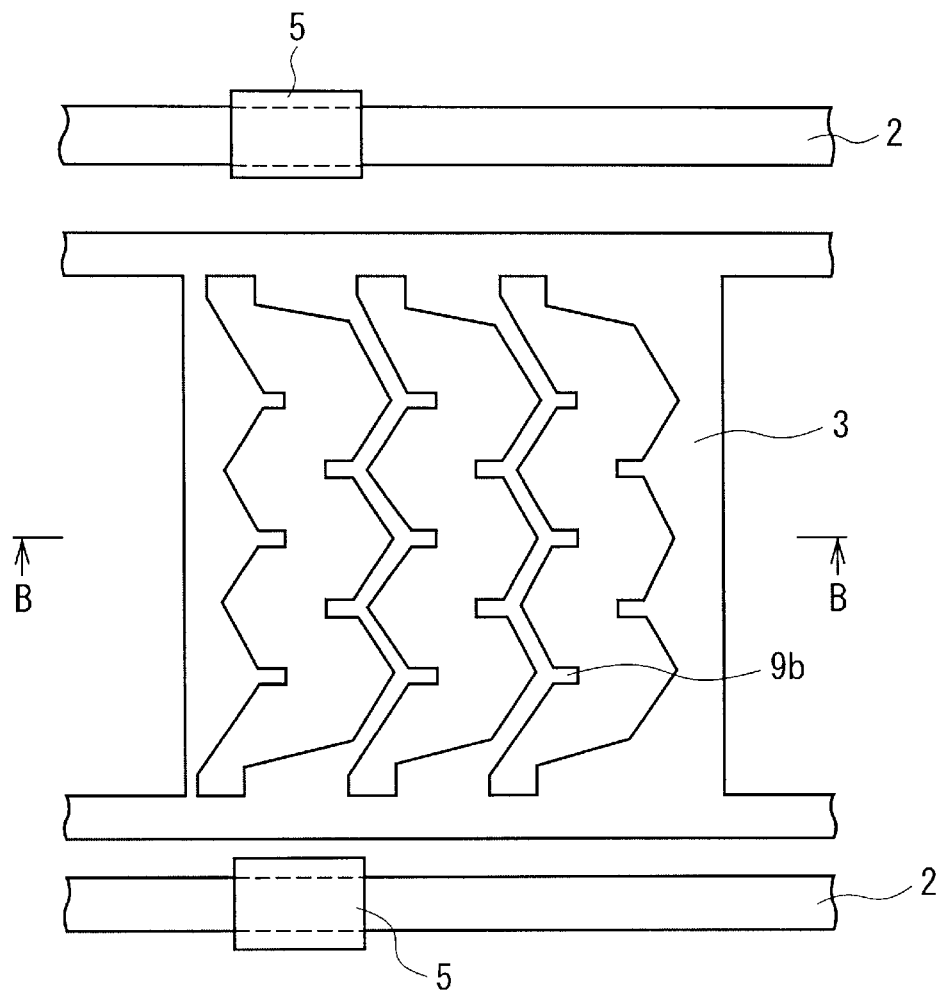
FIG. 5A is a plan view.
Figure 5B:
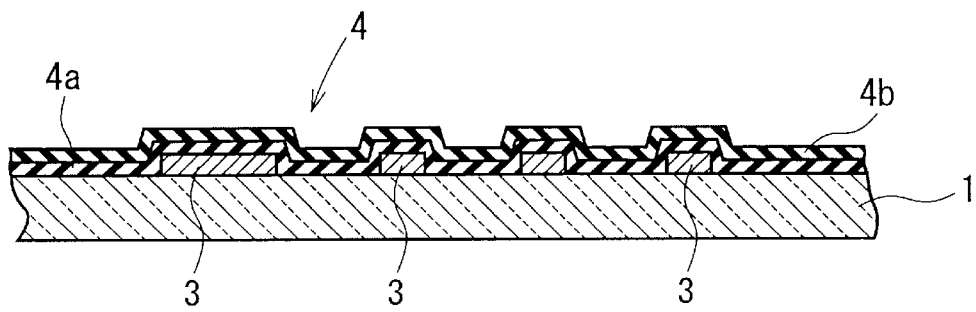
FIG. 5B is a sectional view along line B—B of FIG. 5A.
Figure 6A:
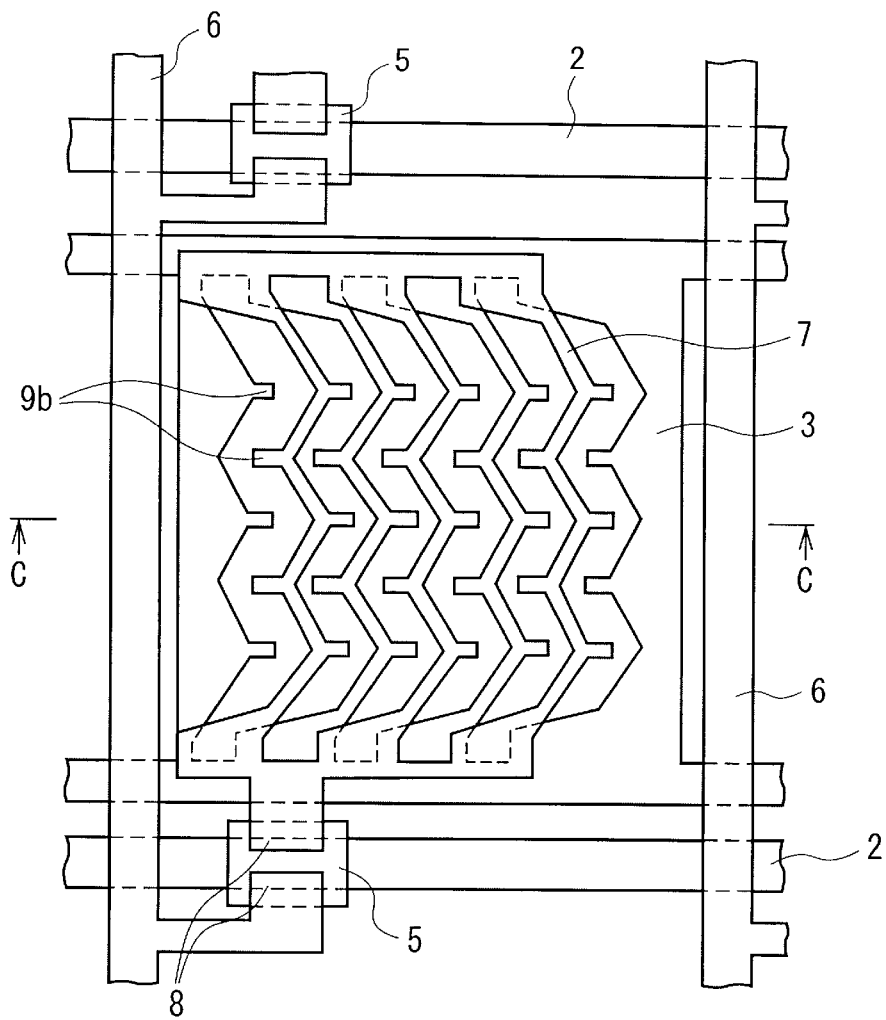
FIG. 6A is a plan view.
Figure 6B:
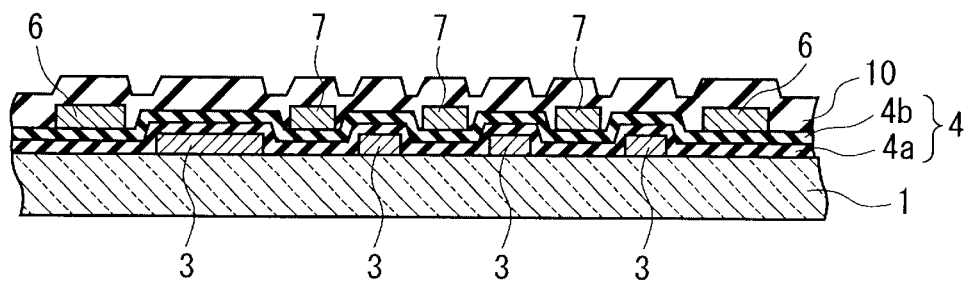
FIG. 6B is a sectional view along line C—C of FIG. 6A.
Figure 7A:
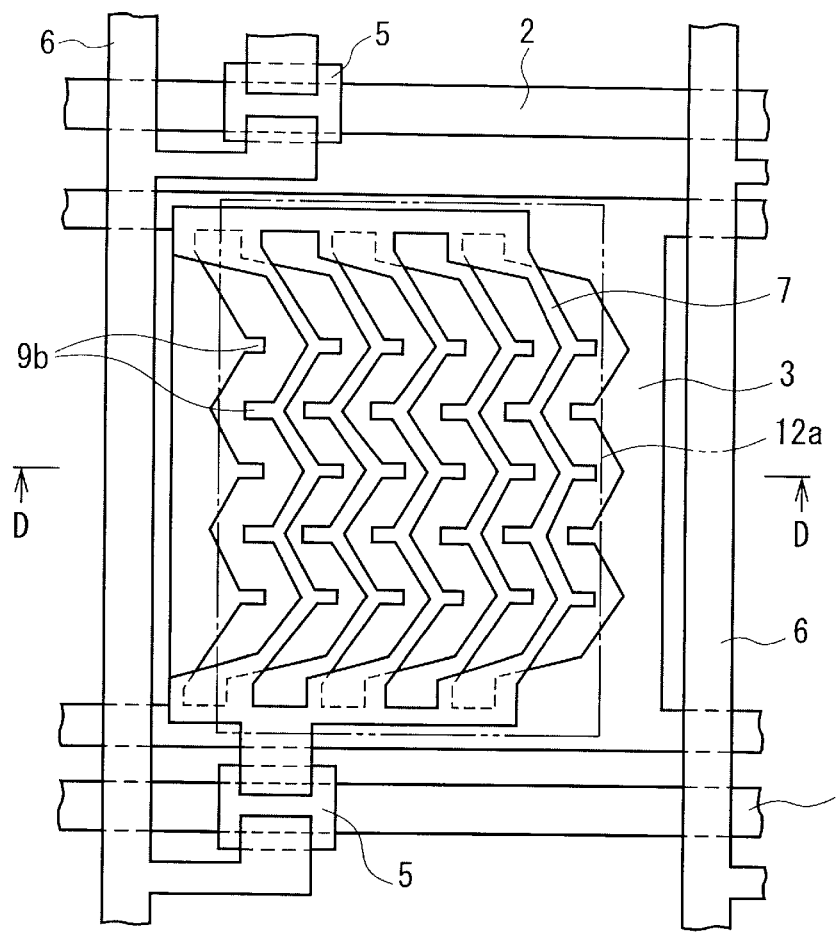
FIG. 7A is a plan view.
Figure 7B:
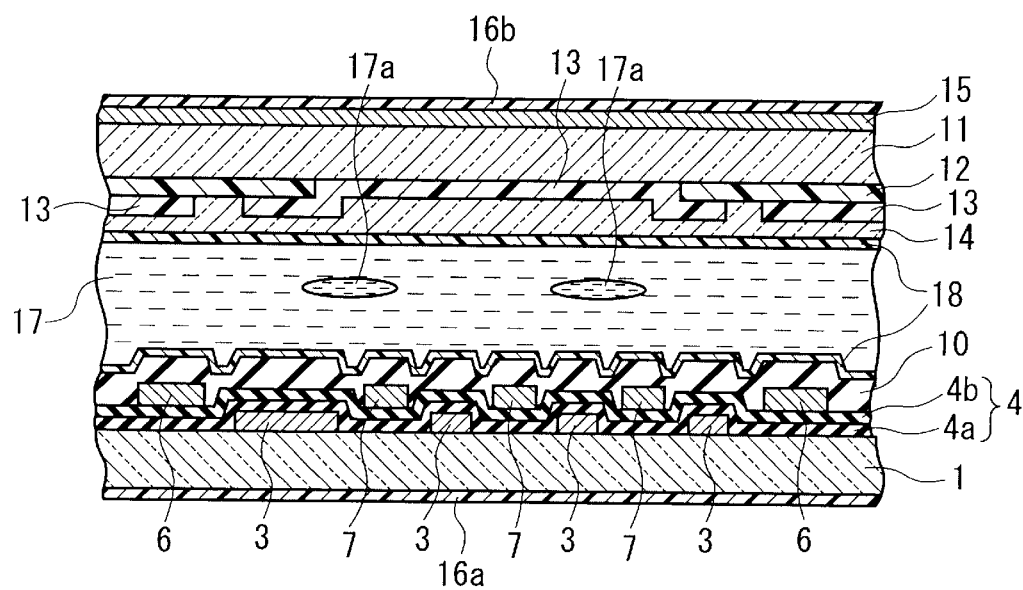
FIG. 7B is a sectional view along line D—D of FIG. 7A.
Figure 8A:
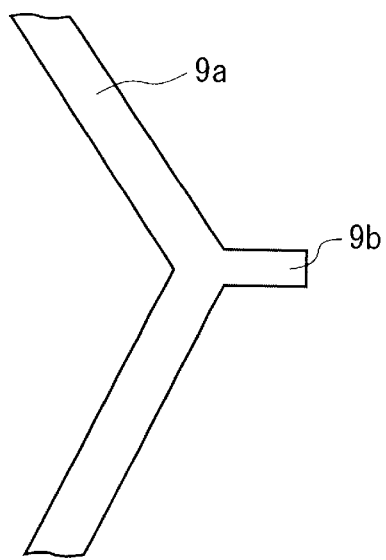
FIG. 8A to FIG. 8D are schematic views illustrating shape of electrode of the liquid crystal display apparatus according to the first embodiment of the present invention.
Figure 8B:
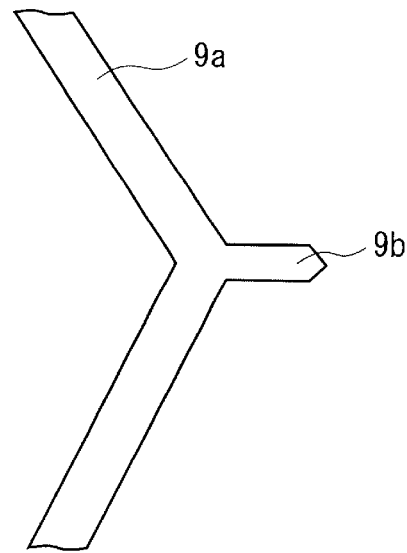
Figure 8C:
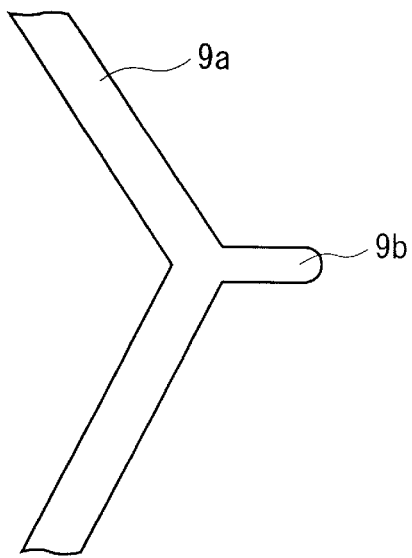
Figure 8D:
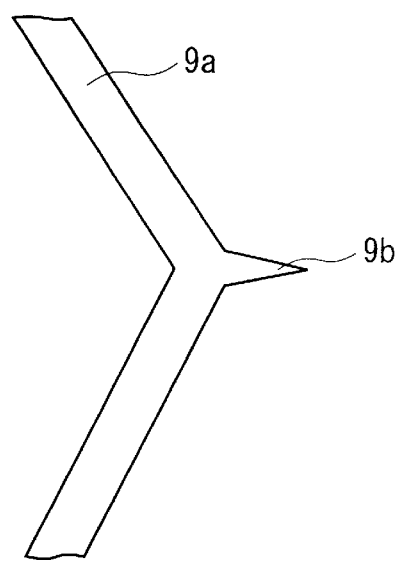
Figure 9:
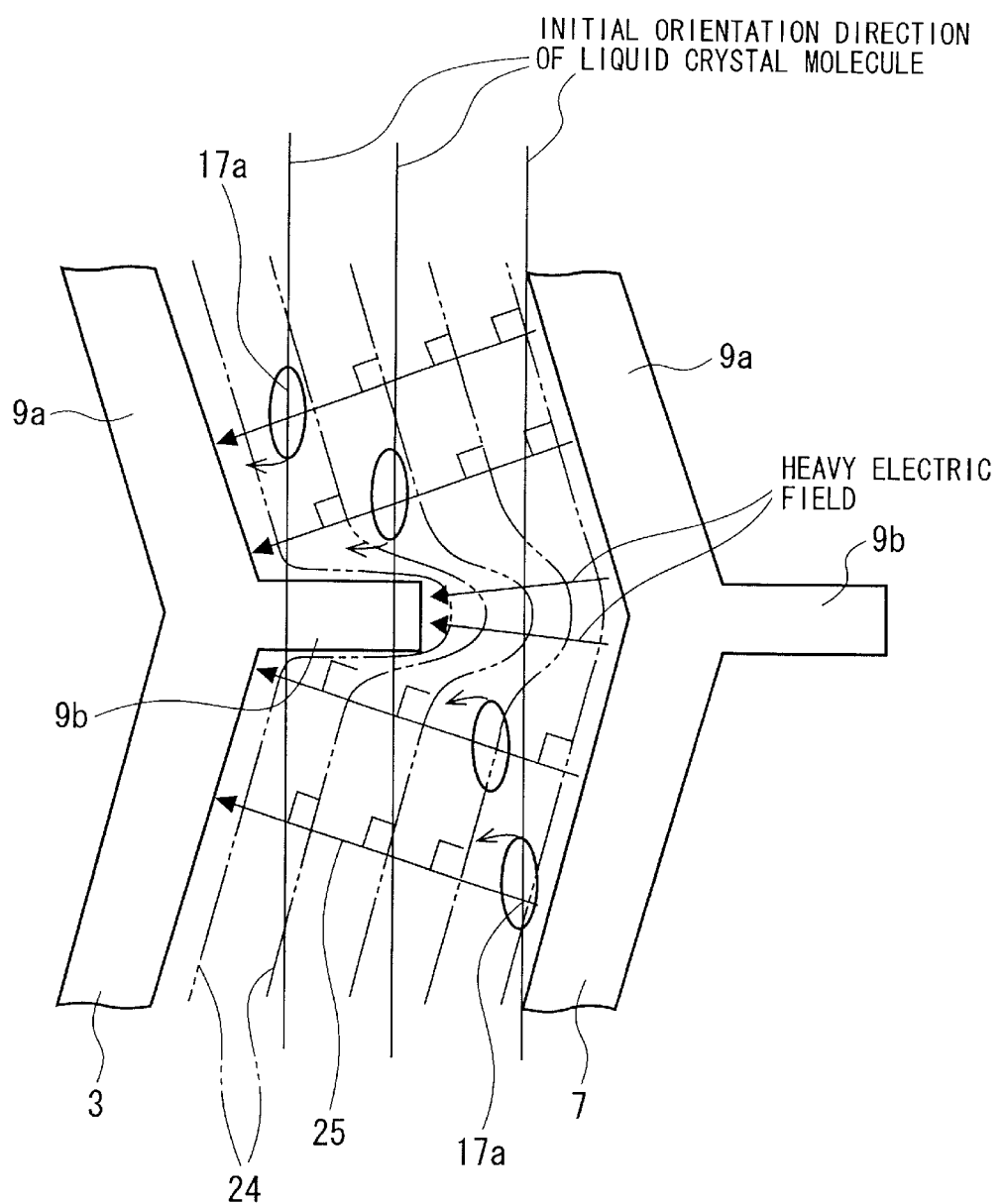
FIG. 9 is a plan view illustrating electric field direction and rotational direction of liquid crystal molecules of the liquid crystal display apparatus according to the first embodiment of the present invention.
Figure 10:
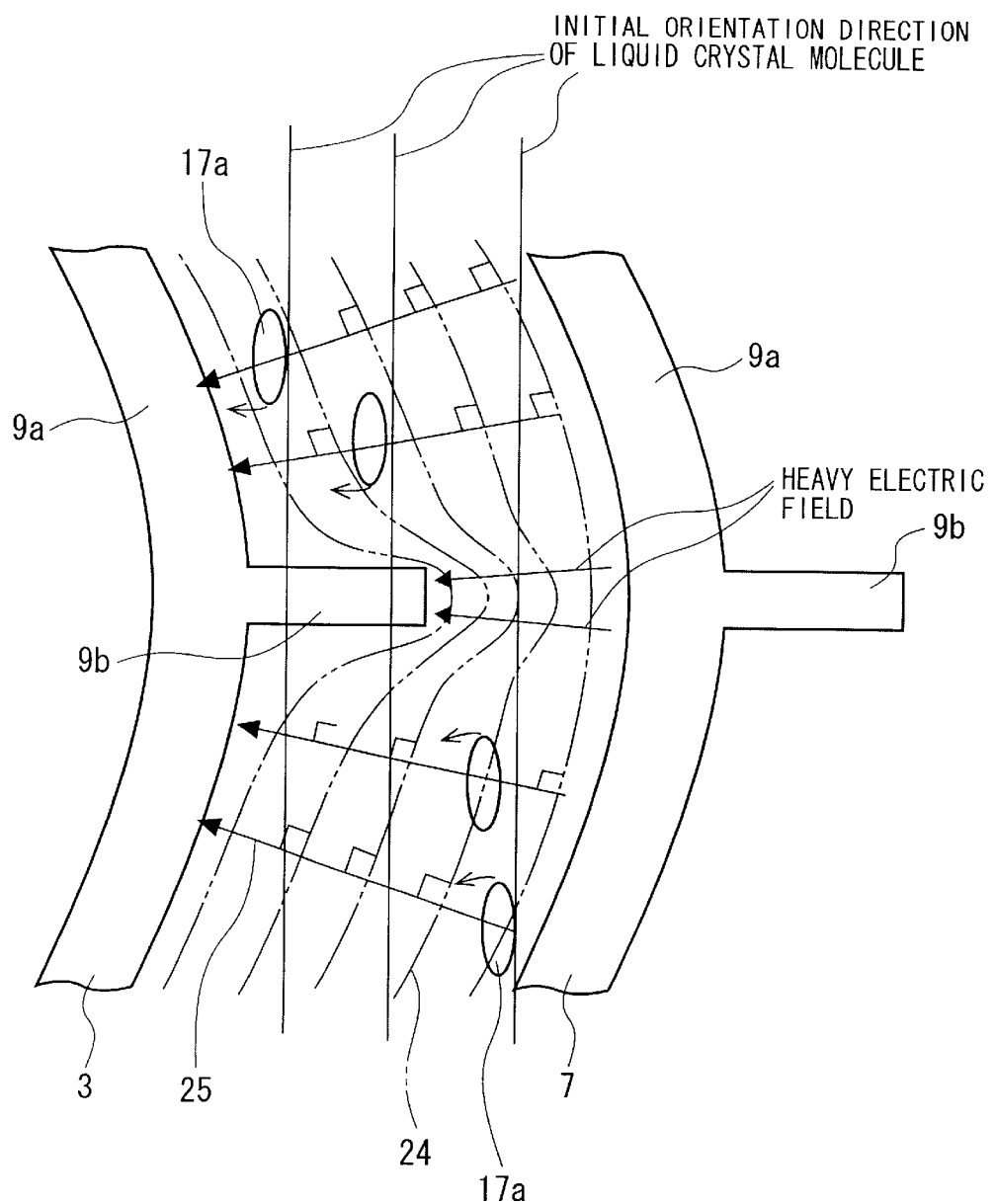
FIG. 10 is a plan view illustrating electric field direction and rotational direction of liquid crystal molecules of the liquid crystal display apparatus according to the first embodiment of the present invention.
Figure 11:
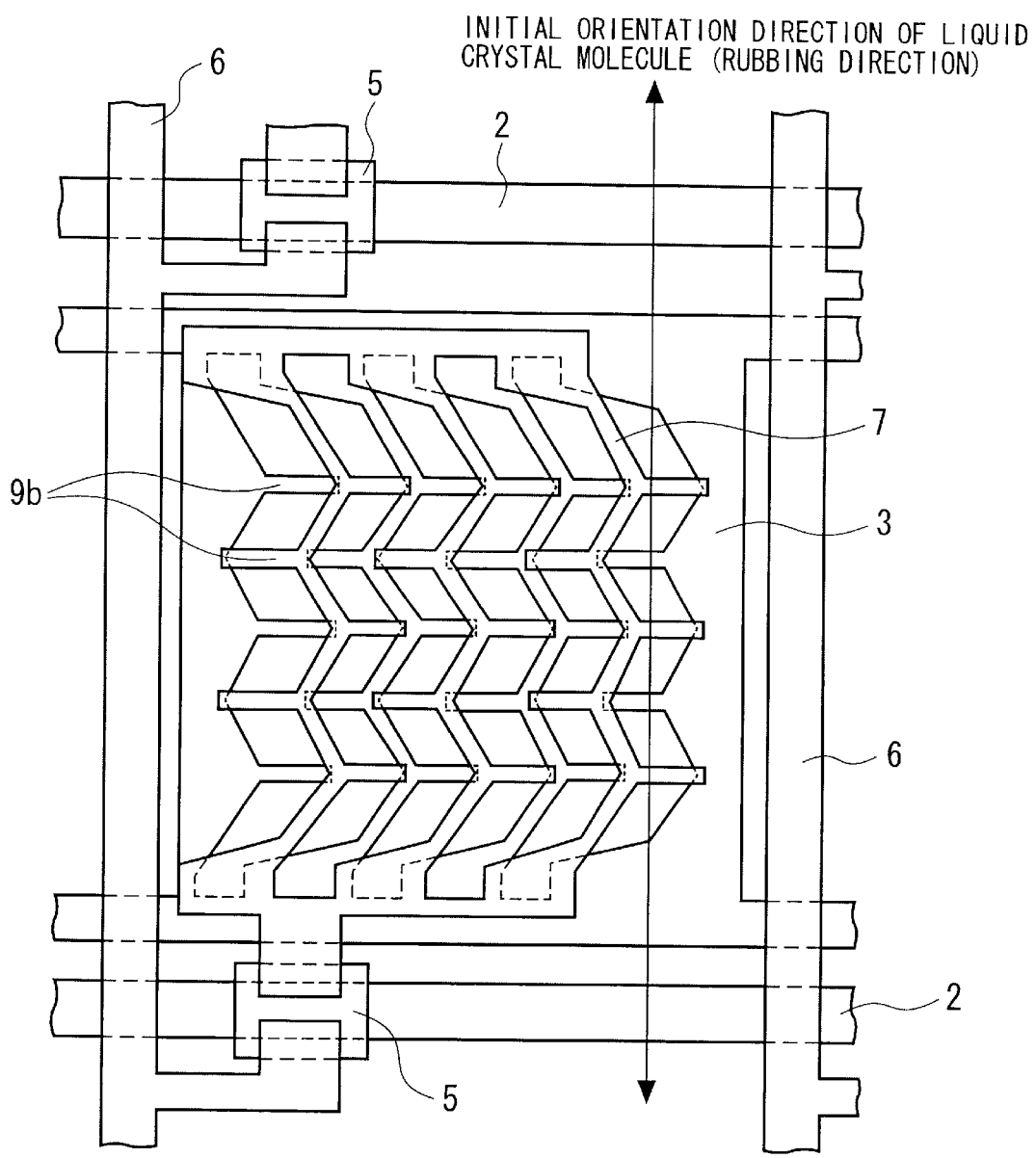
FIG. 11 is a plan view illustrating another constitution of the liquid crystal display apparatus according to the first embodiment of the present invention.
Figure 12:
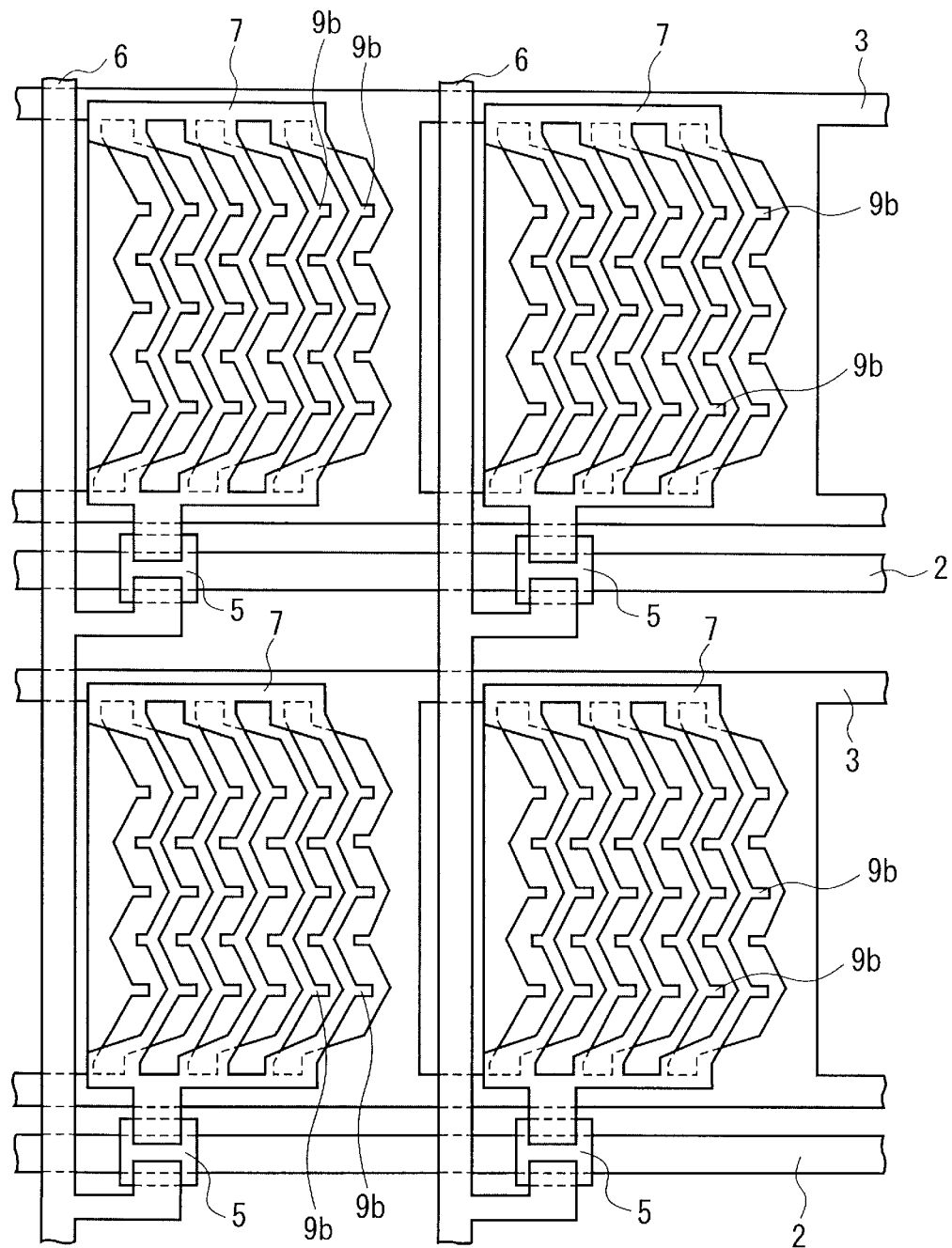
FIG. 12 is a plan view illustrating arrangement example of the liquid crystal apparatus according to the first embodiment of the present invention.

The IPS system liquid crystal display apparatus according to the first embodiment of the present invention will be described referring to FIG. 3 to FIG. 12. FIG. 3 is a plan view illustrating a structure of a liquid crystal display apparatus according to a first embodiment of the present invention. FIG. 4 is a view schematically illustrating process order of manufacturing method of the liquid crystal display apparatus according to the first embodiment of the present invention, FIG. 4A is a plan view, and FIG. 4B is a sectional view along line A—A of FIG. 4A. FIG. 5 is a view schematically illustrating process order of manufacturing method of the liquid crystal display apparatus according to the first embodiment of the present invention, FIG. 5A is a plan view, and FIG. 5B is a sectional view along line B—B of FIG. 5A. FIG. 6 is a view schematically illustrating process order of manufacturing method of the liquid crystal display apparatus according to the first embodiment of the present invention, FIG. 6A is a plan view, and FIG. 6B is a sectional view along line C—C of FIG. 6A. FIG. 7 is a view schematically illustrating process order of manufacturing method of the liquid crystal display apparatus according to the first embodiment of the present invention, FIG. 7A is a plan view, and FIG. 7B is a sectional view along line D—D of FIG. 7A. FIG. 8A to FIG. 8D are schematic views illustrating shape of electrode of the liquid crystal display apparatus according to the first embodiment of the present invention. FIG. 9 and FIG. 10 are plan views illustrating electric field direction and rotational direction of liquid crystal molecules of the liquid crystal display apparatus according to the first embodiment of the present invention. FIG. 11 is a plan view illustrating another constitution of the liquid crystal display apparatus according to the first embodiment of the present invention. FIG. 12 is a plan view illustrating arrangement example of the liquid crystal apparatus according to the first embodiment of the present invention.

Firstly, a constitution of the liquid crystal display apparatus will be described referring to FIG. 3, FIG. 7A and FIG. 7B as well as FIG. 8A to FIG. 8D. The IPS liquid crystal display apparatus of the present embodiment consists of the first transparent substrate 1 on which TFT 5 is formed, the second transparent substrate 11 on which a color layer 13 is formed, and liquid crystals 17 that are sandwiched between the first transparent substrate 1 and the second transparent substrate 11, and the first transparent substrate 1 forms a gate line 2 and a signal line 6, the gate line 2 is at approximately right angles to the signal line 6, the TFT 5 is arranged at the cross section in the shape of matrix, the matrix shaped TFT 5 at the cross section forms one pixel.

Further, each pixel alternately forms pixel electrodes 7 and common electrodes 3 bent at bent points more than one in parallel with one another, and respective electrodes 3, 7 are constituted by the bent section 9a and the projected sections 9b, which is the characteristic of the present invention. Furthermore, outer edge of the common electrode 3 is positioned at both sides of the pixel, which is formed in approximately parallel with the signal line 6, and is widely formed so as to interrupt leakage electric field from the signal line 6. The pixel electrode 7 is connected to a source electrode of the TFT 5, the common electrode 3 is connected to common electrode wiring extending parallel to the gate line 2, which is formed on the first transparent substrate 1. An interlayer isolation film 4 is formed so as to cover the common electrode 3. When watching horizontally, the pixel electrode 7 is formed on the interlayer isolation film 4 that placed at the position between the common electrode 3 and the common electrode 3. A passivation film 10 is formed so as to cover the pixel electrode 7.

In FIG. 3, an example of rectangular shape as shape of the projected section 9b (referring to FIG. 8A) is illustrated. The projected section 9b allows shape of the bent section 9a of the pixel electrode 7 and the common electrode 3 to be stabilized, as well as the projected section 9b allows electric field between both electrodes to be enhanced. The projected section 9b that only possesses aforementioned functions is sufficient, for instance, as illustrated in FIG. 8B, a shape which is provided with a rectangular projected body having pointed end section, as illustrated in FIG. 8C, a shape which is provided with a rectangular projected body having circular arc shaped smooth end section, as illustrated in FIG. 8D, a shape of sharp-pointed V-character are preferable, width and length of the projection is capable of being set to the optimum value in consideration of degree of disclination and aperture rate of the pixel and so forth.

On the other hand, a black matrix 12 for shading extra light over the gate line 2 and the signal line 6, and these lines 2, 6 and pixel indication section therebetween is formed on the second transparent substrate 11, a color layer 13 for performing color indication of RGB three colors, and a flattening film 14 so as to cover the color layer 13 are formed on the second transparent substrate 11. Further, in the present embodiment, by way of that a black matrix opening section 12a is formed in the rectangular shape, the rectangular shaped black matrix opening 12a removes rough feeling of the whole surface of the liquid crystal panel and also forms strong structure against light leakage from the signal line 6.

Orientation film 18 is applied to opposite surface of these first transparent substrate 1 and second transparent substrate 11, the liquid crystal 17, which is homogeneously oriented in approximately parallel with extended direction of the signal line 6, is sandwiched between the both substrates 1, 11. Further, polarization plates 16a, 16b are affixed to outer side of the both substrates 1, 11, polarization axes of the both polarization plates 16a, 16b are at right angles to each other, one side of the polarization axes is set so as to become parallel to orientation direction of the liquid crystal molecule 17a. Then, constant common electric potential is supplied to the whole common electrodes 3 over wiring of the common electrodes 3, the electric potential is made to write to the pixel electrode 7 through the TFT 5, and lateral electric field is made to give to the pixel electrode 7 and the common electrode 3 therebetween, whereby the liquid crystal molecule 17a is made to execute twist deformation within a surface parallel to the substrate to control indication.

Next, manufacturing method of the liquid crystal display apparatus will be described referring to FIGS. 4A and 4B, to FIGS. 7A and 7B. As illustrated in FIGS. 4A and 4B, metal of Cr and so forth are deposited on the first transparent substrate 1 by sputtering method, subsequently, resist is applied thereon, thereafter, predetermined shaped resist pattern is made to form while executing exposure and development by use of well-known photo-lithography technique. Then, exposed Cr is removed by wet etching with this resist pattern as a mask, thus the gate line 2 and the common electrode 3 are formed. On this occasion, the projected section 9b is formed at projected side top section of the bent section 9a in the common electrode 3.

Subsequently, as illustrated in FIGS. 5A and 5B, after insulating film such as silicone oxide film 4a and so forth is deposited by CVD method, then, silicon nitride film 4b, amorphous silicon (a-Si (not illustrated)) and n type amorphous silicon ($n^+$ a-Si (not illustrated)) are continuously deposited, dry etching is executed with the resist pattern formed thereon as a mask, semiconductor layer of the TFT 5 is formed on the gate line 2 while removing exposed a-Si and $n^+$ a-Si thereafter.

Subsequently, as illustrated in FIGS. 6A and 6B, after deposition of metal such as Cr and so forth by use of the sputtering method and so forth, predetermined shaped resist pattern is formed thereon, then, wet and dry etchings are executed with this resist pattern as a mask, the signal line 6, source/drain electrode 8, pixel electrodes are formed thereafter. On this occasion, the pixel electrode 7 forms a projected section 9b at a projected side top section of the bent section 9a like the common electrode 3. Then, channel dry etching is executed in such a way as to set the source/drain electrode 8 constituted by this Cr as a mask, to remove the $n^+$ a-Si which is exposed in the region of the TFT 5.

Subsequently, passivation film 10 made of silicon nitride film and so forth is deposited by plasma enhanced CVD method, the passivation film 10 of gate terminals and drain terminals, silicon nitride film 4b and silicon oxide film 4a are removed by use of wet or dry etching in such a way as to set the resist pattern that is formed thereon as a mask to expose metallic film of the gate terminal and the drain terminal. Then, ITO (Indium Tin Oxide) is deposited by use of sputtering method and so forth to form electrode terminals to the gate terminal and the drain terminal (not illustrated).

Subsequently, as illustrated in FIGS. 7A and 7B, after a black matrix 12 (light shading section) with rectangular opening section is formed at opposite second transparent substrate 11, then, the second transparent substrate 11 forms color layer 13 of RGB, and the flattening film 14 is deposited thereon. Orientation film 18 is applied to opposite surfaces of the first transparent substrate 1 and the second transparent substrate 11, followed by laminating both substrates 1, 11 to pour the liquid crystal 17 to this clearance. Then, conductive film 15 is formed at the outer side of the substrate 11, and the polarization plate 16b is affixed to the outer side of the conductive film 15. The polarization plate 16a is affixed to the outer side of the substrate 1. Polarization directions of both substrates 1, 11 are at right angles to each other.

Thus in the present embodiment, since the projected section 9b is provided at projected side top section of the bent section 9a of the pixel electrode 7 and the common electrode 3, it is possible to prevent irregularity of indication while planning stabilization of electric field condition close to the bent section 9a in such a way as to control variation of pattern shape of the bent section 9a. Further, it is possible to execute quick response at the time of white indication in such a way as to enhance the electric field strength by narrowing electrode interval of the region, in which orientation direction of the liquid crystal molecule 17a is unstable, to make it easy for the liquid crystal molecule 17a to orient.

This effect will be explained referring to FIG. 9. At upper region of the pixel and lower region of the pixel which are stabilized, the liquid crystal molecule 17a surely rotates clockwise or counterclockwise in the same way as the conventional one, in the position close to the bent section 9a of the pixel electrode 7 and the common electrode 3, it is possible to minimize unstable region of the orientation direction while clearly dividing domain region by forming the projected section 9b. Accordingly, the orientation direction of the liquid crystal molecule 17a is capable of being controlled surely, thus, it is possible to improve dependency of angle of field of vision of chromaticity, and the projected section 9b narrows clearance of electrode, as a result, electric field at a region close to the bent section 9a, in which, previously, response slowed down, is enhanced, thereby, it enables the liquid crystal molecule 17a to be rotated by large force, consequently, it is possible to quicken response of the whole pixels.

In the conventional electrode shape, the orientation direction of the liquid crystal is limited to only two directions, and it is desired that the liquid crystal molecule 17a is made to orient in the arbitrary direction, and the bent section 9a has a shape with smooth circular arc shape for improving visual angle characteristic, however, the bent section 9a with smooth circular arc shape causes the orientation direction of the liquid crystal at a region close to the bent section 9a to be unstable. Accordingly, as illustrated in FIG. 10, the bent section 9a of the common electrode 3 and the pixel electrode 7 is made to shape into smooth circular arc shape, the pointed end section of the bent section is provided with the projected section 9b that is characteristic of the present embodiment, thereby, it is possible to plan stabilization of the orientation of the bent section 9a, and then, it enables the visual angle characteristic to be improved further while continuously changing the orientation direction of the liquid crystal molecule 17a. Moreover, the bent section 9a is made to shape into S-character shape, and the projected side top section of the S-character shape is provided with the projected section 9b, whose constitution brings the same effect.

Further, as illustrated in FIG. 11, also the projected section 9b is capable of being formed in such a way as to lengthen the projected section so as to overlap with opposite concave section of the common electrode 3 and the pixel electrode 7. In this case, it is possible to cover the disclination region by the projected section 9b, however, on the other hand, area increase of the projected section 9b causes decrease of aperture rate, and at overlapped part of the electrodes 3, 7, the electrodes 3, 7 are stacked, thereby, difference in level on the surface of passivation film 10 formed on the electrodes 3, 7 increases, as a result, problem of accumulating scraps of the orientation film occurs on the occasion of rubbing treatment of the orientation film. Consequently, it is suitably that length of the projected section 9b should be designed while totally considering degree of the disclination, response characteristic, rubbing treatment condition, and so forth.

Above description is one in connection with only one pixel. The pixel with structure of the electrodes 3, 7 described-above are made to continuously form in the direction of upper and lower sides and right and left sides, resulting in completion of a liquid crystal panel. For instance, when each pixel is formed in the same direction repeatedly, the liquid crystal panel becomes a structure illustrated in FIG. 12, the structure is capable of improving stability of disclination. Further, as to pixels positioned at upper and lower sides or pixels positioned at right and left sides, it is possible to form the pixels in such a way that bending directions of the electrodes 3, 7 are reversed. In this case, visual angle characteristic is capable of being improved by providing a plurality of electric field directions.

[Second Embodiment]

Figure 13A:
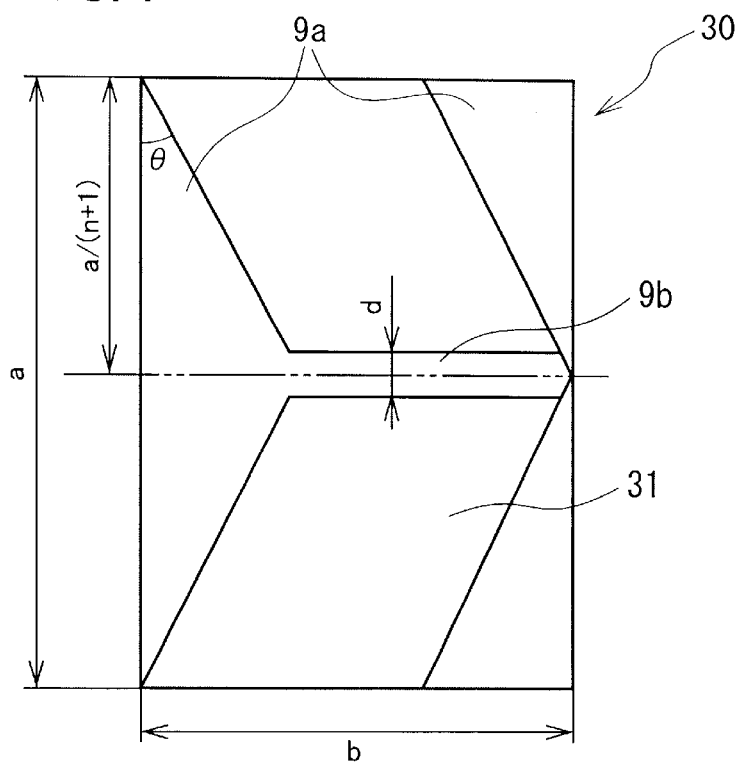
FIG. 13A and FIG. 13B are plan views illustrating shape of unit pixel of the liquid crystal display apparatus according to a second embodiment of the present invention.
Figure 13B:
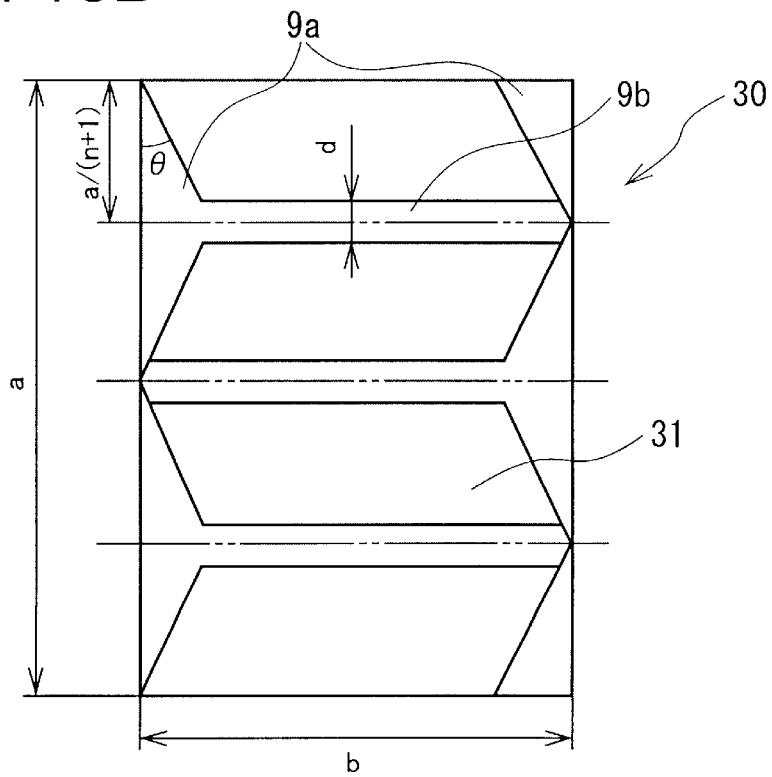

Next, IPS system liquid crystal display apparatus according to the second embodiment of the present invention will be described referring to FIGS. 13A and 13B. FIGS. 13A and 13B are plan views illustrating unit pixel formed by adjacent pixel electrode and common electrode. FIG. 13A illustrates a case that the number of bent point is one, and FIG. 13B illustrates a case that the number of bent point is three. The present embodiment describes about technique for optimizing shape of the projected section 9b and the number of bent point from the viewpoint of the aperture rate.

Namely, although it is possible to plan improvement of the visual angle characteristic when increasing the number of bent point, in cases where respective bent sections 9a of the pixel electrode 7 and the common electrode 3 are provided with the projected section 9b, decrease of the aperture rate caused by the fact that light of the opening section is shaded by the projected section 9b may be expected. Accordingly, equation which brings optimum value of the number of the bent point from the viewpoint of the aperture rate will be introduced in connection with the unit pixel that is formed by mutually opposite the pixel electrode 7 and the common electrode 3, which is introduced under the following procedure.

Firstly, in FIGS. 13A and 13B, unit pixel 30 is illustrated, in which width thereof is a, length thereof is b, its aperture section is indicated by 31, and the unit pixel is enclosed by light shading section. An area S1 of the unit pixel 30 is given by equation (1).

$$S1 = a \times b \tag{1}$$

Next, the number of bent point is taken to be n, bent angle of the electrode is taken to be θ. The electrode is divided into the bent section 9a and the projected section 9b. An area S2 of the bent section 9a and an area S3 of the projected section 9b are given by equation (2) and equation (3). Here, calculation is made to execute in the case that the projected section 9b is extending to opposite electrode.

$$S2 = a \times (a/(n+1)) \times \tan \theta \tag{2}$$

$$S3 = n \times d \times (b - (a/(n+1)) \times \tan \theta) \tag{3}$$

Consequently, an area of the opening section becomes S1–S2–S3, an aperture rate X is given by equation (4).

$$X=(S1-S2-S3)/S1$$

$$=(a-nd)\times(b-(a\times\tan\theta)/(n+1))/ab \quad (4)$$

The aperture rate given by above equation (4) is calculated with n as a parameter under conditions, at a=300 μm, b=100 μm, θ=15°, d=3 μm. Relationship between the number of bent point and aperture rate becomes table 1. Further, unit of S1, S2, S3 and opening area is "μm²".

TABLE 1

| Number of bent point | S1 | S2 | S3 | Area of aperture | Aperture rate |
|---|---|---|---|---|---|
| 1 | 30000 | 12058 | 179 | 17763 | 59.2% |
| 3 | 30000 | 6029 | 719 | 23252 | 77.5% |
| 5 | 30000 | 4019 | 1299 | 24682 | 82.3% |
| 7 | 30000 | 3014 | 1889 | 25097 | 83.7% |
| 9 | 30000 | 2412 | 2483 | 25105 | 83.7% |
| 11 | 30000 | 2010 | 3079 | 24911 | 83.0% |
| 13 | 30000 | 1723 | 3676 | 24601 | 82.0% |
| 15 | 30000 | 1507 | 4274 | 24219 | 80.7% |
| 17 | 30000 | 1340 | 4872 | 23788 | 79.3% |
| 19 | 30000 | 1206 | 5471 | 23323 | 77.7% |

As indicated in Table 1, when the bent angle θ of the electrode is constant, the more the number of bend of the electrode increases, the less the area S2 of the bent section 9a decreases gradually, on the other hand, the area S3 of the projected section 9b increases together with increase of the number of bend. Consequently, the area of the electrode S1+S2 in which both areas are added has a point of inflection and the area becomes the minimum value at the predetermined number of the bend, namely, the aperture rate becomes maximum value. In the condition of the present embodiment, the aperture rate becomes the maximum value in the condition that the number of the bend is seven or nine.

Thus, in determining shapes of the pixel electrode 7 and the common electrode 3, it is possible to increase the aperture rate by calculating the above-described equation (1) to equation (4). Further, in the above-described equation (4), width D of the projected section 9b is fixed to 3 μm, and length of the projected section 9b is one which comes into contact with opposite electrode, however, in order to determine the shape of the projected section 9b so that the aperture rate further increases, it is possible to calculate in such a way that calculation is made to execute with the width d of the projected section 9b and ratio (77%) of length of the projected section 9b to distance between electrodes as a parameter.

Here, when considering the ratio (η%) of length of the projected section 9b to distance between electrodes, the equation (3) and the equation (4) become as follows:

$$S3'=(n\times d\times(b-(a/(n+1))\times\tan\theta))\times\eta \quad (5)$$

$$X'=(a-nd\eta)\times(b-(a\times\tan\theta)/(n+1))/ab \quad (6)$$

The aperture rate is made to calculate with n, d, and η as parameters by use of the above-described equation (5) and equation (6), thereby, it becomes possible to select combination of the number of bend n that the aperture rate becomes the largest one and shape of the projected section 9b.

[Third Embodiment]

Figure 14A:
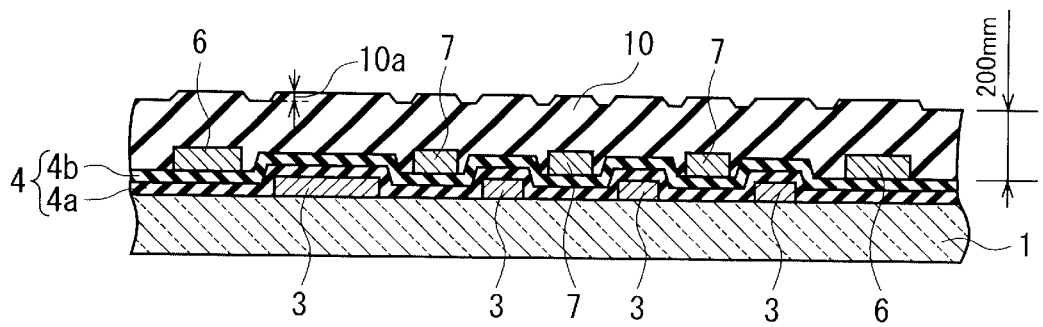
FIG. 14A to FIG. 14C are sectional views illustrating structures of the liquid crystal display apparatus according to a third embodiment of the present invention.
Figure 14B:
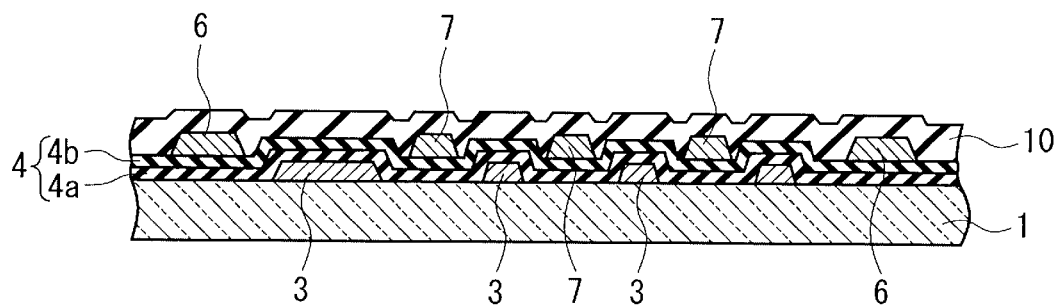
Figure 14C:
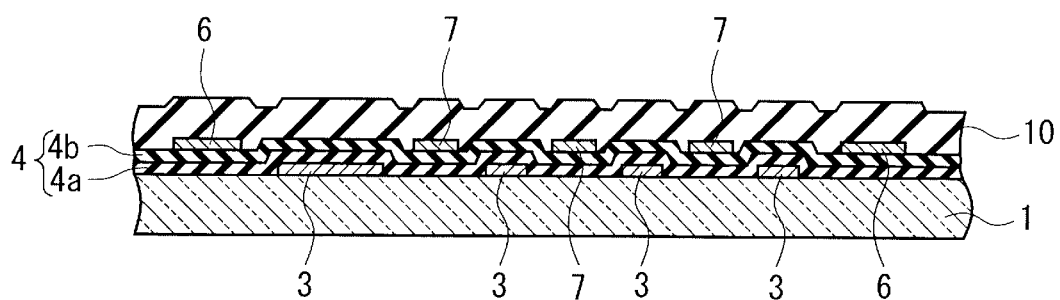

Next, IPS system liquid crystal display apparatus according to the third embodiment of the present invention will be described referring to FIGS. 14A to 14C. FIGS. 14A to 14C are sectional views illustrating structure of TFT side substrate of the liquid crystal display apparatus according to the third embodiment. The present embodiment describes about a structure and method for reducing scraps of the orientation film that are formed on the occasion of the rubbing treatment of the orientation film, constitution of the other parts is the same as that of the first and the second embodiments.

As illustrated in FIGS. 14A to 14C, in the TFT side substrate of the liquid crystal display apparatus formed the gate line 2 and the common electrode 3 on the first transparent substrate 1, the signal line 6 and the pixel electrode 7 are formed thereon through the interlayer isolation film 4 made of the silicon oxide film 4a, silicon nitride film 4b and so forth, further, the passivation film 10 with predetermined film thickness is formed on this upper layer. Then, the orientation film 18 (referring to FIG. 7B) is formed on the passivation film 10, and rubbing treatment is made to perform in the predetermined direction (in general, extended direction of the signal line in the case of the multi domain structure with bent point more than one). At this time, a difference in level 10a that reflects film thickness of the pixel electrode 7 and the common electrode 3 is formed on the surface of the passivation film 10. The scraps of the orientation film at the time of the rubbing treatment are accumulated caused by the difference in level 10a, as a result, deterioration of picture quality occurs, that is, luminance becomes large at the time of black indication caused by irregularity in the orientation direction.

This problem is easy to occur in a structure in which shapes of the pixel electrode 7 and the common electrode 3 are bent, in particular, as the present invention, in the structure that the bent section 9a of the pixel electrode 7 and the common electrode 3 is provided with the projected section 9b, the scraps of the orientation film are easy to accumulate because the difference in level 10a is also formed in the direction which is at approximately right angles to the direction of the rubbing treatment. Accordingly, the present embodiment proposes technique in which the scraps of the orientation film 18 is difficult to accumulate.

Firstly, as illustrated in FIG. 14A, the first technique is that film thickness of the passivation film 10 is made to thicken in order to minimize the difference in level 10a. According to experiment of the present inventor, relationship among the film thickness of the passivation film 10, size of the difference in level 10a and the luminance at the time of black indication become values as shown in Table 2.

TABLE 2

| Film thickness (nm) of passivation film | Difference in level (nm) | Black luminance (cd/m²) |
|---|---|---|
| 100 | 280 | 0.905 |
| 200 | 200 | 0.896 |
| 500 | 150 | 0.879 |
| 1000 | 100 | 0.867 |

As known from the Table 2, when the film thickness of the passivation film 10 is thickened, the difference in level 10a is minimized, the difference in level of the electrode is absorbed, so that the difference in level formed on the surface thereof is minimized, thereby, the scraps of the orientation film on the occasion of the rubbing treatment are difficult to accumulate, as a result, the luminance at the time of black indication is minimized while being reduced irregularity in the orientation direction. This luminance at the time of black indication is 0.9 cd/m² which is capable of being judged as a level without problem on indication, accordingly, it is suitable that the difference in level may be made to set to less than 200 nm by setting the film thickness of the passivation film 10 to more than 200 nm.

Next, the second technique is indicated in FIG. 14B. As illustrated in FIG. 14B, cross sectional shape of the pixel electrode 7 and the common electrode 3 is made to form into tapered shape (trapezoid shape) with smooth slope, thereby, it is possible to minimize the difference in level 10a formed at the passivation film 10. In order to realize such tapered shape, it is suitable that etching method of the pixel electrode 7 and the common electrode 3 is improved, for instance, when Cr is used as electrode material, it is possible to realize appropriate tapered shape in such a way that longish wet etching is performed by using cerium ammonium nitrate as etchant.

Further, the third technique is indicated in FIG. 14C. As illustrated in FIG. 14C, it is possible to minimize the difference in level 10a of the passivation film 10 by making film thickness of the pixel electrode 7 and the common electrode 3 thinner. In this case, it is suitable that material whose conductivity is larger than that of Cr is used as the electrode material in order to suppress increase of resistance of the electrode caused by reduction of film thickness.

Furthermore, combination of the aforementioned techniques is capable of further minimizing the difference in level 10a, moreover, there is a method (not illustrated) that insulation film for filling in the difference in level therewith after forming the electrodes of respective layers is formed separately, and improvement of material of the passivation film 10 or deposition method of the passivation film, furthermore, it is possible to flatten by use of annealing method or CMP (Chemical Mechanical Polishing) method after deposition of the passivation film 10.

[Fourth Embodiment]

Figure 15:
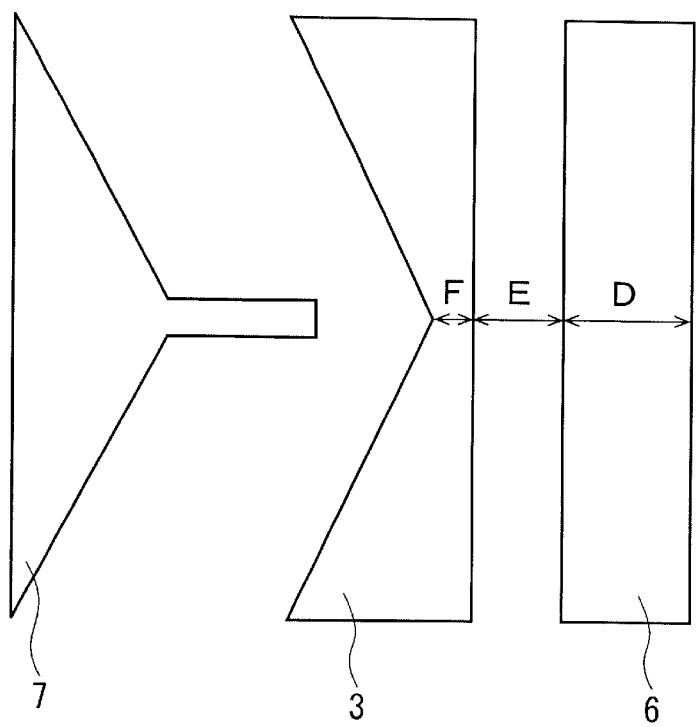
FIG. 15 is a plan view illustrating shape of an electrode close to a signal line of the liquid crystal display apparatus according to a fourth embodiment of the present invention.
Figure 16A:
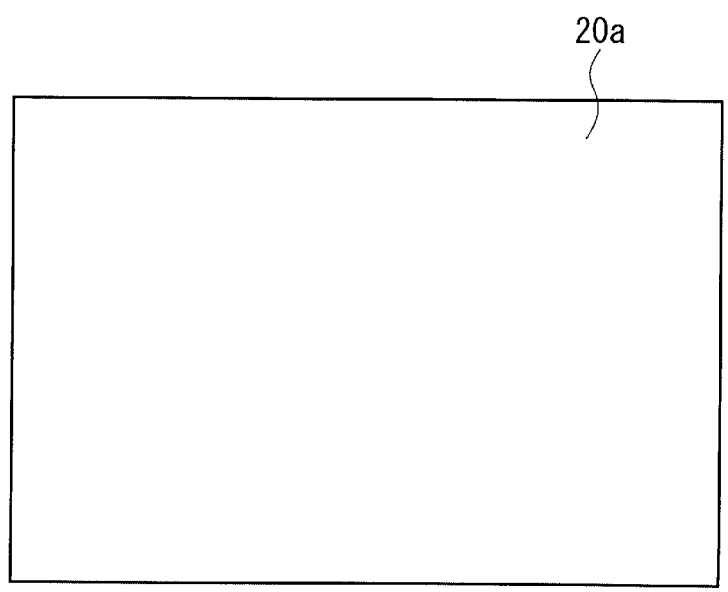
FIG. 16A and FIG. 16B are plan views illustrating panel displaying surface of the liquid crystal display apparatus according to the fourth embodiment of the present invention.
Figure 16B:
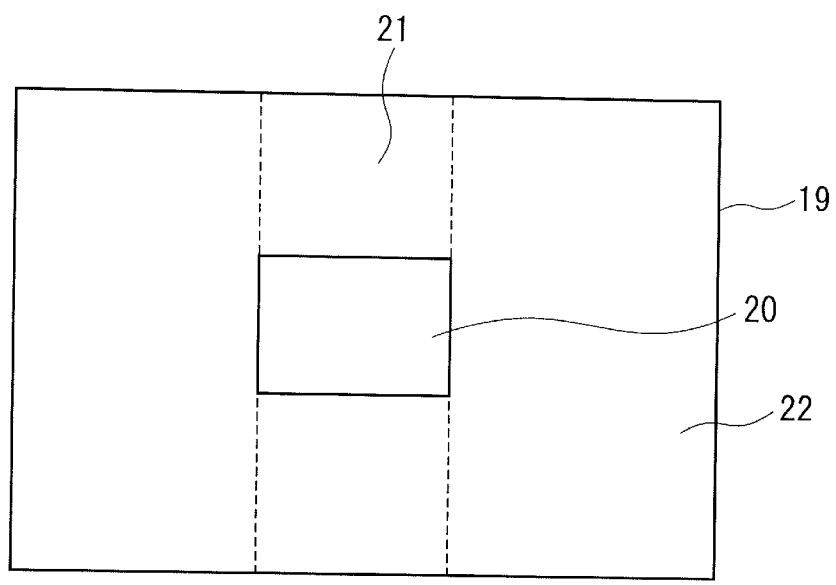

Next, IPS system liquid crystal display apparatus according to the fourth embodiment of the present invention will be described referring to FIG. 15 and FIGS. 16A and 16B. FIG. 15 is a plan view illustrating enlarged the common electrode and the pixel electrode close to the signal line of the liquid crystal display apparatus of the fourth embodiment, FIGS. 16A and 16B are schematic views for explaining cross talk of the liquid crystal panel. Further, the present embodiment, in designing the liquid crystal display apparatus, describes about technique for optimizing width between the common electrodes around the pixel.

In the liquid crystal display apparatus, the orientation direction of the liquid crystal 17 which is sandwiched between the substrates 1, 11, is controlled by electric field between the pixel electrode 7 and the common electrode 3, and high voltage is applied to the gate line 2 and the signal line 6 in order to drive the liquid crystal 17, the liquid crystal molecule 17a existing in between the gate line 2, the signal line 6 and the common electrode 3 rotates in different direction from the pixel region caused by electric field influenced by these electrodes. When the liquid crystal molecule 17a rotes in such unexpected direction, also the liquid crystal molecule 17a is in disarray in connection with its orientation direction caused by elastic characteristic, thus resulting in occurrence of cross talk and so forth, further, at the time of the black indication, in which the electric field is not applied to the pixel electrode 7 and the common electrode 3 therebetween, the liquid crystal molecule 17a cannot be returned to the initial orientation direction, accordingly, decrease of contrast as well as delay of response occur.

Particularly, above-described problem is easy to appear in the liquid crystal display apparatus with structure, in which there comes to be a narrower place in distance between the signal line 6 and an inner edge of the common electrode 3, further, aforementioned liquid crystal display apparatus is affected by light leakage from the side of the signal line 6. In order to alleviate the effect of the signal line 6, it is appropriate that distance between the signal line 6 and the common electrode 3 is enlarged, on the other hand, when enlarging distance between electrodes, the pixel region is minimized, which decreases the aperture rate.

Accordingly, the inventor of the present application executes researches as illustrated in FIG. 15. In the researches, distance (E) between the signal line 6 and the common electrode 3 is taken as constant, width D of the signal line 6 and width (F) of the narrowest part (in the present embodiment: concave section of the bent section 9a) of width of the common electrode 3 are taken to be parameters, and the study is made to execute about degree of the cross talk (phenomenon (referring to FIG. 16B) in which gray region 21 occurs upper side and lower side of the white indication 20 when center of the liquid crystal panel 19 is made to set into white-indication.) Table 3 indicates a result thereof. In an evaluation of the cross talk of Table 3, although in the screen where the cross talk is easy to occur, the cross talk cannot be ascertained by visual inspection, wherein ○ is added. FIG. 16A illustrates a white indication region 20a in which the whole surface is only white indication, and FIG. 16B illustrates white indication region 20 in part. Luminance of the white indication region 20a is taken to be L1, luminance of the white indication region 20 is taken to be L2. When the luminance L1 and the luminance L2 satisfy following equation (7), ○ is added. While when the luminance L1 and the luminance L2 do not satisfy following equation (7), × is added.

$$(L2-L1)/L1 \times 100 \leq 6 \tag{7}$$

TABLE 3

| D (μm)    | 8   | 8 | 8   | 10  | 10 | 10  |
|-----------|-----|---|-----|-----|----|-----|
| E (μm)    | 2   | 2 | 2   | 2   | 2  | 2   |
| F (μm)    | 2.5 | 4 | 5.5 | 2.5 | 4  | 5.5 |
| Cross talk| ×   | ○ | ○   | ×   | ×  | ○   |

As known from Table 3, when the width D of the signal line 6 is 8 μm, the cross talk can be suppressed in such a way that the narrowest width part (F) of the common electrode 3 is set to more than 4 μm, however, when the width D of the signal line 6 becomes 10 μm, influence from the signal line 6 becomes large, accordingly, the narrowest width part (F) of the common electrode 3 should necessary be more than 5.5 μm. Above-described relation may be made to represent by experience-based equation. In order to suppress the cross talk, D, E and F are necessary to satisfy following relationship.

$$F \geq D \times 0.75 - E \tag{8}$$

Thus, a shape of bent section of the common electrode 3 is made to set so as to satisfy relationship of the equation (8) on the occasion of determination of the electrode shape of the liquid crystal display apparatus, thereby, decrease of the aperture rate can be held within the minimum value, and it is possible to suppress the cross talk. This relational expression can be applied to some structures of the liquid crystal display apparatus not only the structure in which the bent section 9a is provided with the projected section 9b as indicated in the first embodiment described-above. The relational expression can be applied to a bend electrode structure without the projected section 9b. The relational expression can be applied to a structure in which straight line shaped common electrode 3 is obliquely arranged to the signal line 6.

[Fifth Embodiment]

Figure 17A:
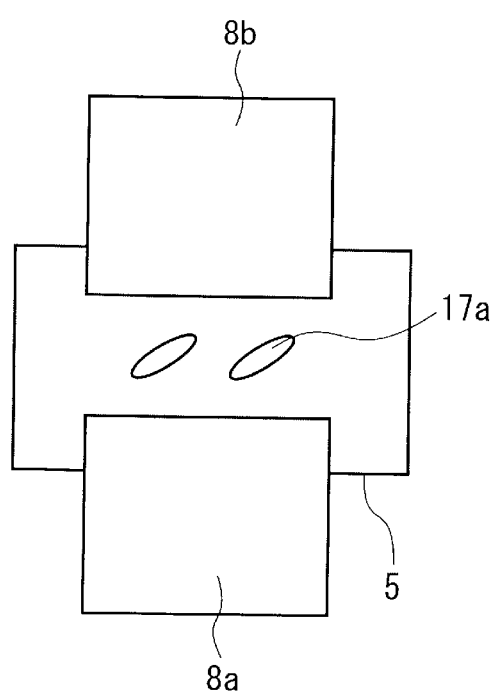
FIG. 17A to FIG. 17C are views illustrating a structure close to TFT of the liquid crystal display apparatus according to a fifth embodiment of the present invention.
Figure 17B:
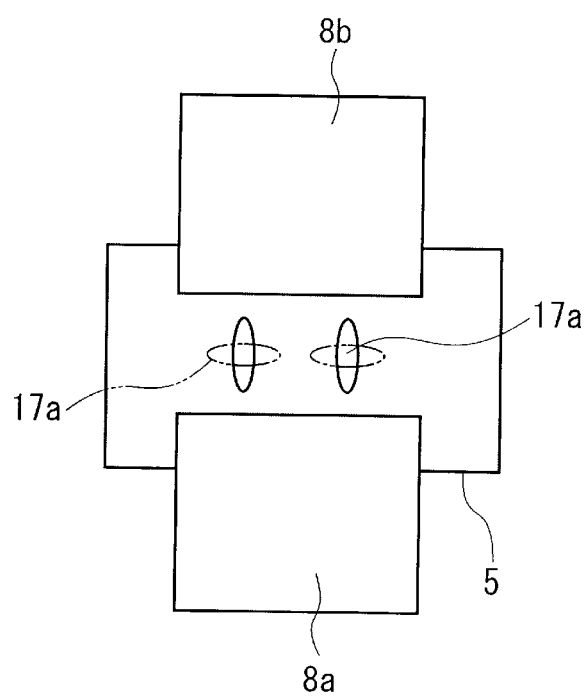
Figure 17C:
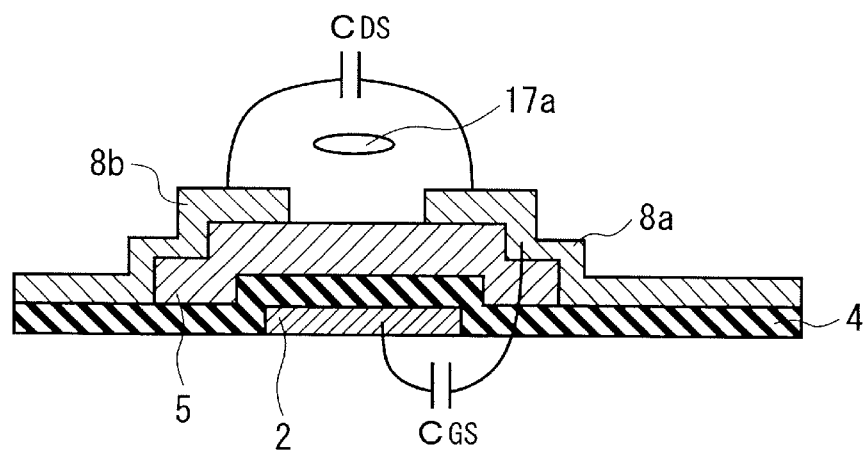
Figure 18:
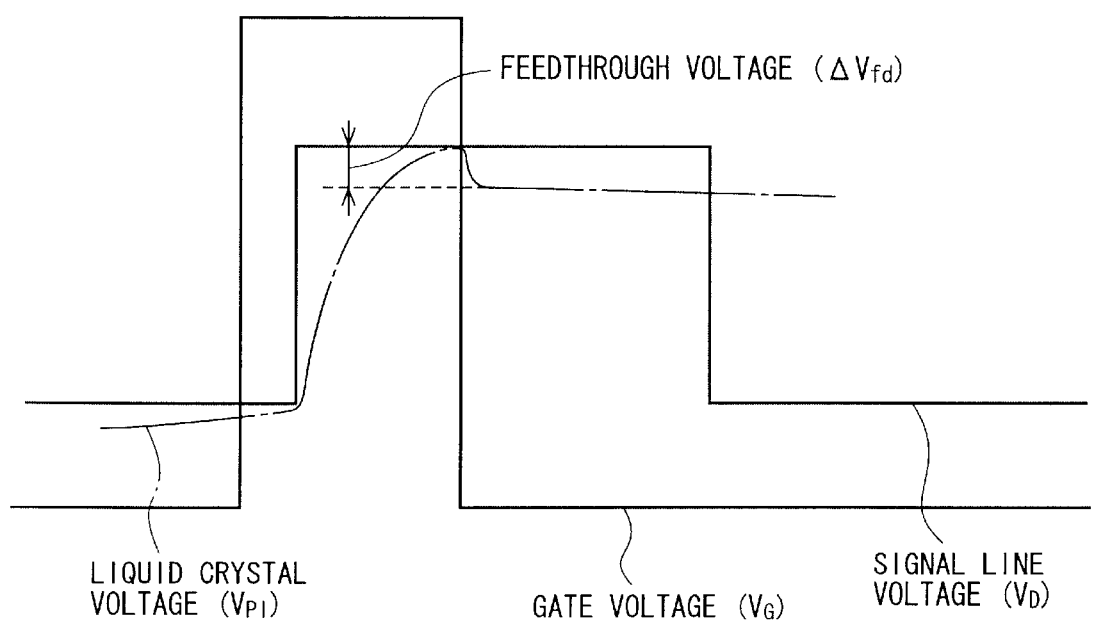
FIG. 18 is a timing chart illustrating a gate voltage, a signal line voltage and a pixel electrode voltage of the liquid crystal display apparatus.
Figure 19:
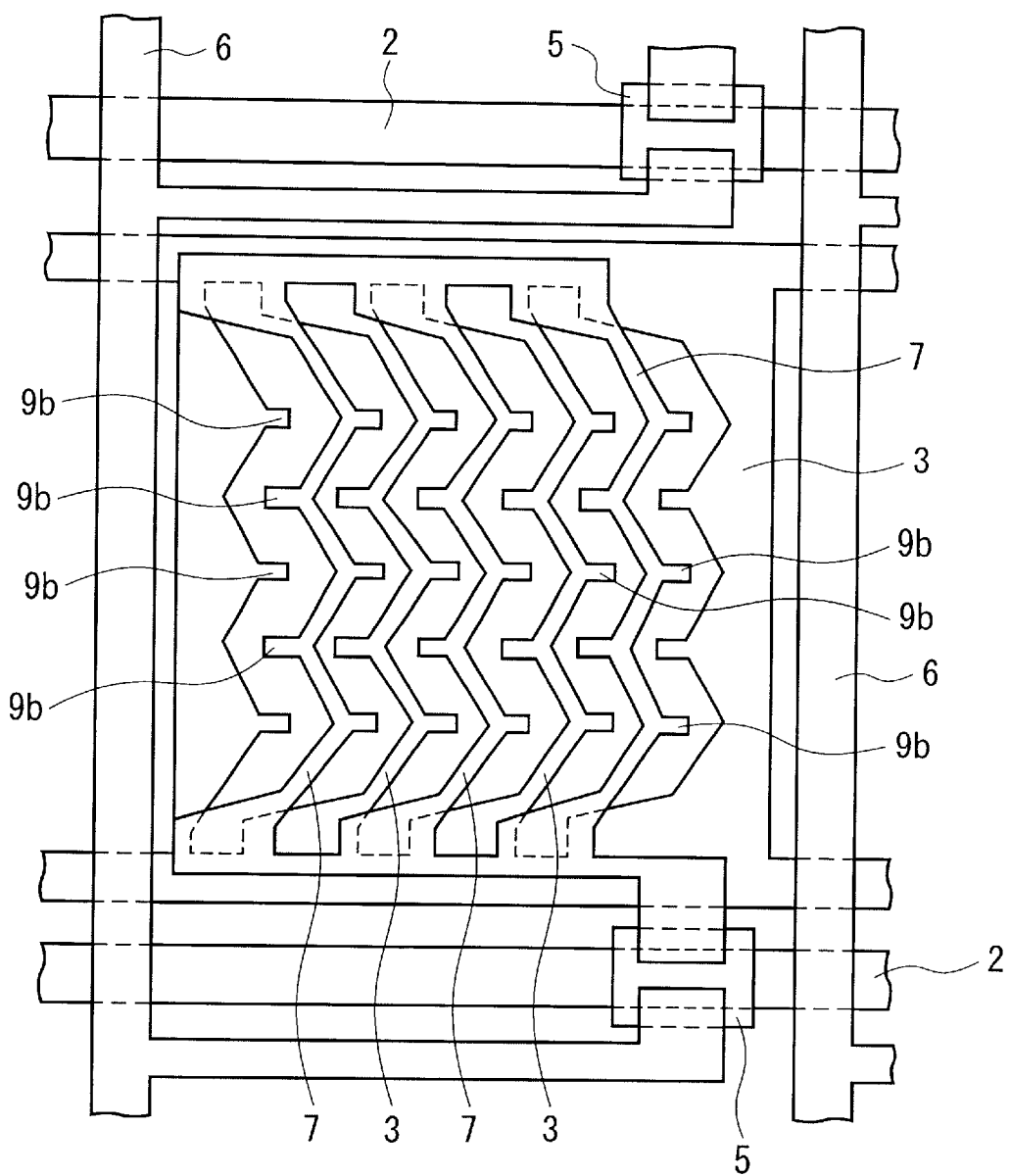
FIG. 19 is a plan view illustrating a structure of the liquid crystal display apparatus according to the fifth embodiment of the present invention.

Next, the IPS system liquid crystal display apparatus according to the fifth embodiment of the present invention will be described referring to FIGS. 17A to 17C, and FIG. 18 and FIG. 19. FIGS. 17A to 17C are schematic views illustrating orientation direction of the liquid crystal close to TFT of the liquid crystal display apparatus according to the fifth embodiment. FIG. 17A and FIG. 17B are plan views, FIG. 17C is a schematic sectional view, FIG. 18 is a timing chart illustrating voltage applied to the gate line, the signal line and the pixel electrode, FIG. 19 is a plan view illustrating one constitution example of the liquid crystal display apparatus of the present embodiment. The present embodiment examines about behavior of the liquid crystal molecule 17a of the TFT region and influence of incident light to TFT.

Liquid crystal voltage $V_{PI}$ applied to the pixel electrode 7 will be described. As illustrated in FIG. 18, when a signal of a gate voltage $V_G$ is turned ON, a signal line voltage $V_D$ applied to the signal line 6 is applied to the pixel electrode 7. Writing with predetermined write characteristic is carried out. Then, the signal of the gate voltage $V_G$ is turned OFF, the liquid crystal voltage $V_{PI}$ decreases by one feedthrough voltage $\Delta V_{fd}$, thereafter, the liquid crystal voltage gradually becomes small while leaking in accordance with predetermined retention characteristic.

The feedthrough voltage $\Delta V_{fd}$ is generated when charged electric charges within liquid crystal capacitance and within accumulation capacitance at the time the gate voltage $V_G$ being turned ON are re-distributed to the respective capacitances at the moment the gate voltage $V_G$ being turned OFF. Here, a liquid crystal capacitance is taken to be $C_{LC}$, an additional capacitance is taken to be $C_{SC}$, a parasitic capacitance between the gate line and the source electrode is taken to be $C_{GS}$, another capacitance is taken to be $C_\alpha$. The feedthrough voltage $\Delta V_{fd}$ is represented by the following equation (9).

$$\Delta V_{fd} = (C_{GS}/(C_{LC}+C_{SC}+C_{GS}+C\alpha)) \times V_G \quad (9)$$

Here, the parasitic capacitance $C_{GS}$ in the equation (9) is a TFT structure dependent parameter which cannot be changed easily. For that reason, generally, reduction of the feedthrough voltage $\Delta V_{fd}$ is planned by increasing the additional capacitance $C_{SC}$, however, when the feedthrough voltage $\Delta V_{fd}$ is changed, electric potential of the pixel electrode fluctuates. Accordingly, it is important that fluctuation of respective capacitances is controlled. In particular, $C_\alpha$ among the aforementioned capacitances is one that cannot be expected, it is important to stabilize this capacitance to control a drive of the liquid crystal.

As the $C_\alpha$, capacitance of drain and source therebetween mainly corresponds thereto, the capacitance of drain and source therebetween depends on the orientation direction of the liquid crystal between both electrodes. This will be explained referring to FIGS. 17A to 17C. As illustrated in FIG. 17A, when the liquid crystal 17 is obliquely oriented to gate length direction (source/drain electrode opposite direction) of the TFT 5, the liquid crystal molecule 17a rotates as the voltage of the source/drain electrodes 8 therebetween is changed so that the capacitance $C_{DS}$ of the source/drain therebetween illustrated in FIG. 17C is changed. However, as illustrated in FIG. 17B, the liquid crystal molecule 17a is oriented at right angles to gate length direction of the TFT 5 or the liquid crystal molecule 17a is oriented in parallel with gate length direction of the TFT 5.

In such a case, the liquid crystal molecule 17a is difficult to rotate relative to change of voltage of the source/drain electrodes 8 therebetween, accordingly, change of the capacitance $C_{DS}$ subsides.

Consequently, at the time of the white indication, or at the time of the black indication, since the voltage of the source/drain electrodes 8 therebetween is different, in order to suppress change of the feedthrough voltage $\Delta V_{fd}$, it is important that initial orientation direction of the liquid crystal is made to set in the direction in parallel with the gate length direction of the TFT 5 or in the direction which is at right angles to the gate length direction of the TFT 5. In the liquid crystal display apparatus of the aforementioned first embodiment, the liquid crystal molecule 17a is made to orient in the direction of the signal line 6, and the TFT 5 is made to arrange so that its gate length direction agrees with direction of the signal line 6 in consideration of this point.

Further, the present embodiment is capable of being applied to not only the liquid crystal display apparatus of the structure with the projected section 9b at the pixel electrode 7 and the common electrode 3, but also like the liquid crystal display apparatus of the bent electrode structure as well as straight line shaped electrode structure without the projected section 9b. In particular, in the liquid crystal display apparatus of the straight line shaped electrode structure, the initial orientation direction of the liquid crystal molecule 17a is made to obliquely set to the signal line 6 (the pixel electrode 7 or the common electrode 3) in order to plan stabilization of the orientation direction. However, in this case, it is important that the gate length direction of the TFT 5 is made to obliquely set to the signal line 6, and the TFT 5 is made to arrange so that the gate length direction of the TFT 5 is in parallel with the initial orientation direction of the liquid crystal molecule 17a or the gate length direction of the TFT 5 is at right angles to the initial orientation direction of the liquid crystal molecule 17a.

As described above, description is made regarding the influence that behavior of the liquid crystal molecule 17a on the TFT 5 region affects the feedthrough voltage $\Delta V_{fd}$. Next, influence of incidence of the light into the TFT 5 will be described. Generally, in the liquid crystal display apparatus of bottom gate form of inverse stagger structure, the TFT 5 is formed on the gate line 2, further the black matrix 12 is formed at the position close to the gate line 2 and the signal line 6. Accordingly, the structure is one in which there is no incident of light of the back light from the TFT substrate side and no incident of light from the CF substrate side to the active region of the TFT 5.

However, in the liquid crystal display apparatus, electrodes and so forth constituted by light reflective metal are put around the substrate, there are some chances in which light of the back light or diffracted light at the black matrix aperture section are reflected by these electrodes and so forth, resulting is incidence of these lights into the active region of the TFT 5, accordingly, transistor characteristic of the TFT 5 is fluctuated depending on such lights, that is the problem of picture quality deteriorations. In particular, when wiring and the TFT 5 are heavily arranged in order to increase the aperture rate, it is important that incident light toward the TFT 5 is effectively interrupted.

In the conventional straight line shaped comb teeth electrode structure of the liquid crystal display apparatus, the electrode is approximately formed in symmetry in the right and left of the pixel, therefore, there is no big difference regarding influence of incident light, even though the TFT 5 is formed in any position on the gate line 2. However, in the liquid crystal display apparatus of the structure in which the electrode is obliquely formed to the gate line 2 and the signal line 6, or in the liquid crystal display apparatus of the bent electrode structure, electrode shape regarding right and left position, and/or electrode shape regarding upper and lower position, are different from one another. Thus, difference of influence of the incident light occurs depending on which position the TFT 5 is formed.

Accordingly, in the present embodiment, on the occasion of arrangement of the TFT 5 to the bend electrode structure of the liquid crystal display apparatus, it is characterized that the TFT 5 is made to provide at a corner on the side of wide width of the common electrode that encloses circumference of the pixel. Namely, in the liquid crystal display apparatus illustrated in FIG. 19, when comparison is made between the common electrodes 3 of right and left of the pixel, width of the right side common electrode 3 is broader than that of the left side common electrode 3. It is possible to increase the distance between the TFT 5 and the pixel aperture section by forming the TFT 5 at the right side of the pixel. As a result, it is possible to suppress unexpected incident of the light to the TFT 5.

As described-above, according to the structure of the IPS liquid crystal display apparatus of the present invention, there are effects described latter.

The effect of the first embodiment of the present invention is that it is possible to prevent irregularity of indication and it is possible to speed response of the liquid crystal by providing the bent section convex side top section of the pixel electrode and the common electrode with the projected section, thereby, it allows electric field condition to be stabilized while suppressing variation of the shape of the electrode. Also, electric field of the region where rotational direction of the liquid crystal molecule is unstable is made to enhance so that response of the liquid crystal becomes fast.

The effect of the second embodiment of the present invention is that it is possible to set the conditions for the maximum aperture rate. Namely, the equation (1) to the equation (6) brings the number of bend, and width and length of the projected section for the maximum aperture rate while calculating the aperture rate in accordance with the equation (1) to the equation (6).

The effect of the third embodiment of the present invention is that it is possible to prevent deterioration of the picture quality, and film thickness of the passivation film is made to set to the predetermined value, preferably to set to more than 200 nm so that it causes the difference in level of the passivation film to be less than 200 nm. Or, cross sectional shape of the electrode is taken to be tapered shape. Or, film thickness of the electrode is made thinner. These measures cause scraps of the orientation film at the time of rubbing treatment to be difficult to accumulate in the passivation film.

The effect of the fourth embodiment of the present invention is that it is possible to prevent the cross talk caused by the signal line, by setting width of the most narrowest section of the common electrode in accordance with the equation (8) with the aperture rate largely maintained.

The effect of the fifth embodiment of the present invention is that it is possible to prevent characteristic fluctuation of the TFT. The feedthrough voltage fluctuation can be suppressed in such a way that the gate length direction of the TFT is in parallel with the initial orientation direction of the liquid crystal molecule or the gate length direction of the TFT is at right angles to the initial orientation direction of the liquid crystal molecule. The characteristic fluctuation of the TFT caused by unexpected light can be prevented by setting the TFT to the wide side of width of the common electrode.

What is claimed is:

1. A liquid crystal display apparatus of IPS system comprising:
    a pair of substrates opposing each other:
    a liquid crystal sandwiched between said pair of substrates:
    a plurality of gate lines and a plurality of signal lines which cross each other and are provided on one of said pair of substrates:
    a plurality of thin film transistors provided to intersections of said gate line and said signal line; and
    pixel electrodes and common electrodes, both of which are provided at each pixel surrounded by said gate line and said signal line, each of which has bent points more than one and is alternately formed in parallel with each other, both of said pixel electrodes and said common electrodes having: bent sections; and projected sections projecting toward concave section of said bent section of an opposite electrode side from convex side top section of said bent section, and said common electrode around said pixel arranged close to said signal line being formed in such a way that outer edge of the side of said signal line is formed in the shape of a straight line along said signal line,
    wherein said IPS system liquid crystal display apparatus allows liquid crystal molecule to be rotated within a surface in approximately parallel with said substrate by applying a voltage to said pixel electrode and said common electrode therebetween.

2. The liquid crystal display apparatus according to claim 1, wherein said bent section is formed in "<" shape or circular arc shape.

3. The liquid crystal display apparatus according to claim 1, wherein when viewed in the direction normal to said substrate, said projected section and said concave section of said bent section of said opposite electrode are formed without overlapping each other.

4. The liquid crystal display apparatus according to claim 1, wherein said projected section is formed in rectangular shape.

5. The liquid crystal display apparatus according to claim 1, wherein said projected section is formed in the shape that rectangular shaped projected body is provided with a pointed end section projecting toward said concave section of said bent section of said opposite electrode.

6. The liquid crystal display apparatus according to claim 1, wherein said projected section is formed in the shape that rectangular shaped projected body is provided with a circular arc shaped pointed end section.

7. The liquid crystal display apparatus according to claim 1, wherein said projected section is formed in V-character shape projecting toward said concave section of said bent section of said opposite electrode.

8. The liquid crystal display apparatus according to claim 1, wherein the number of bent point of said pixel electrode and said common electrode is taken to be n (n is odd numbers more than 1), adjacent said pixel electrode and said common electrode are formed, and unit pixel which becomes aperture section is enclosed by light shading section, in cases where length of electrode extending direction of said unit pixel is taken to be a, length of electrode opposite direction of said unit pixel is taken to be b, width of said projected section is taken to be d, and a ratio of length of said projected section to clearance between said pixel electrode and said common electrode is taken to be $\eta$, in which combination among n, d, and $\eta$ is selected so that following equation that indicates an aperture rate becomes maximum:

$(a-nd\eta) \times (b-(a \times \tan\theta)/(n+1))/ab$.

9. The liquid crystal display apparatus according to claim 1, wherein width of said signal line is taken to be D, distances between outer edge of said common electrode around said pixel being disposed at a position adjacent to said signal line and said signal line is taken to be E, and width of part of the narrowest width of said common electrode is taken to be F, in which F is set so that F becomes larger value than D×0.75−E.

10. The liquid crystal display apparatus according to claim 1, wherein film thickness of a passivation film is set so that a difference in level on said passivation film which is formed at upper layer of said pixel electrode and said common electrode becomes less than 200 nm.

11. The liquid crystal display apparatus according to claim 1, wherein said TFT is disposed in such a way that gate length direction of said TFT is in approximately parallel to or at approximately right angles to initial orientation direction of a liquid crystal molecule.

12. The liquid crystal display apparatus according to claim 1, wherein said TFT is disposed close to an intersection of said gate line and said signal line at wide width side of said common electrode existing at side end section of said gate line among said common electrodes disposed close to said signal line.

13. A liquid crystal display apparatus of IPS system comprising:

a pair of substrates opposing to each other;

a liquid crystal sandwiched between said pair of opposite substrates;

a plurality of gate lines and a plurality of signal lines which cross each other and are provided on one of said pair of substrates;

a plurality of thin film transistors provided to intersections of said gate line and said signal line;

pixel electrodes and common electrodes, both of which are provided at each pixel surrounded by said gate line and said signal line, and each of which is alternately formed in parallel with each other, in which said IPS system liquid display apparatus allows liquid crystal molecule to be rotated within a surface in approximately parallel with said substrate by applying a voltage to said pixel electrode and said common electrode therebetween, said liquid crystal molecule is initially oriented obliquely to a direction at right angles to said gate line, and said TFT is stationed so that a gate length direction of said TFT is in approximately parallel with said initial orientation direction or is at approximately right angles to said orientation direction.

14. A liquid crystal display apparatus of IPS system comprising:

a pair of substrates opposing to each other;

a liquid crystal sandwiched between said pair of opposite substrates;

a plurality of gate lines and a plurality of signal lines which cross each other and are provided on one of said pair of substrates;

a plurality of thin film transistors provided to intersections of said gate line and said signal line;

pixel electrodes and common electrodes, both of which are provided at each pixel surrounded by said gate line and said signal line, and each of which has bent points more than one and is alternately formed in parallel with each other, in which said IPS system liquid display apparatus allows liquid crystal molecule to be rotated within a surface in approximately parallel with said substrate by applying a voltage to said pixel electrode and said common electrode therebetween, said common electrode around said pixel arranged close to said signal line is formed in such a way that outer edge of the side of said signal line is formed in the shape of a straight line along said signal line, and said TFT is stationed close to an intersection between said gate line and said signal line at the common electrode side with wide width existing in said gate line side end section among said common electrodes disposed close to said signal line.

* * * * *

UNITED STATES PATENT AND TRADEMARK OFFICE
CERTIFICATE OF CORRECTION

PATENT NO. : 6,618,109 B2 Page 1 of 1
DATED : September 9, 2003
INVENTOR(S) : Masanobu Hidehira et al.

It is certified that error appears in the above-identified patent and that said Letters Patent is hereby corrected as shown below:

<u>Title page</u>,
Item [*] Notice, "by 0 days." should read -- by 164 days. --

Signed and Sealed this

Fifth Day of October, 2004

JON W. DUDAS
*Director of the United States Patent and Trademark Office*